United States Patent
Okada et al.

(10) Patent No.: US 8,105,970 B2
(45) Date of Patent: Jan. 31, 2012

(54) OLEFIN POLYMERIZATION CATALYST COMPONENT AND PRODUCTION PROCESS THEREOF, AND PRODUCTION PROCES OF OLEFIN POLYMERIZATION CATALYST AND OLEFIN POLYMER

(75) Inventors: Mitsuhiro Okada, Sodegaura (JP); Wataru Hirahata, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/053,444

(22) Filed: Mar. 22, 2011

(65) Prior Publication Data
US 2011/0245439 A1    Oct. 6, 2011

(51) Int. Cl.
*B01J 31/02*   (2006.01)
*C08F 4/50*    (2006.01)

(52) U.S. Cl. ..................... 502/169; 526/124.3
(58) Field of Classification Search ................ 526/124.3
See application file for complete search history.

(56) References Cited

U.S. PATENT DOCUMENTS

| | | | |
|---|---|---|---|
| 4,727,049 A | 2/1988 | Furuhashi et al. | |
| 4,737,481 A | 4/1988 | Murata et al. | |
| 4,814,312 A * | 3/1989 | Murata et al. | 502/111 |
| 4,942,148 A | 7/1990 | Furuhashi et al. | |

FOREIGN PATENT DOCUMENTS

| | | |
|---|---|---|
| JP | 02-252704 A | 10/1990 |
| JP | 06-049119 A | 2/1994 |

* cited by examiner

*Primary Examiner* — David W Wu
*Assistant Examiner* — Sonya Wright
(74) *Attorney, Agent, or Firm* — Panitch Schwarze Belisario & Nadel LLP

(57) ABSTRACT

A solid catalyst component for olefin polymerization containing a titanium atom, a magnesium atom, a halogen atom, and a defined internal electron donor such as dodecanedioyl dichloride; a production process of such a solid catalyst component, using a titanium compound, a magnesium compound, and the above internal electron donor, or using a solid component containing a titanium atom and a magnesium atom, and the above internal electron donor; a production process of a solid catalyst, using (i) the above solid catalyst component, (ii) an organoaluminum compound, and (iii) an external electron donor; and a production process of an olefin polymer using the above solid catalyst.

14 Claims, No Drawings

OLEFIN POLYMERIZATION CATALYST COMPONENT AND PRODUCTION PROCESS THEREOF, AND PRODUCTION PROCES OF OLEFIN POLYMERIZATION CATALYST AND OLEFIN POLYMER

FIELD OF THE INVENTION

The present invention relates to (i) a solid catalyst component for olefin polymerization, (ii) a process for producing a solid catalyst component for olefin polymerization, (iii) a process for producing a solid catalyst for olefin polymerization, and (iv) a process for producing an olefin polymer.

BACKGROUND OF THE INVENTION

There are known in the art many solid catalyst components for olefin polymerization containing a titanium atom, a magnesium atom, a halogen atom, and an internal electron donor. It is also known in the art that an internal electron donor exerts a great deal of influence on a catalyst performance of a catalyst component for olefin polymerization.

JP 2-252704A discloses a polymerization process of propylene in the presence of a catalyst formed from a titanium trichloride composition, an organoaluminum compound, an organosilicon compound, and an ester of an aliphatic acid such as an adipic acid ester as an internal electron donor.

Patent literatures such as JP 6-49119A, JP 61-21109A (corresponding to U.S. Pat. No. 4,727,049A), JP 62-146904A (corresponding to U.S. Pat. No. 4,737,481A), and JP 1-98603A (corresponding to U.S. Pat. No. 4,942,148A) disclose an olefin polymerization catalyst using a sebacic acid ester as an internal electron donor.

SUMMARY OF THE INVENTION

However, an olefin polymer produced by use of the above respective olefin polymerization catalysts contains an unsatisfactory amount of a material soluble in a low-temperature organic solvent. The present invention has an object to provide (i) a solid catalyst component for olefin polymerization, which is high in its polymerization activity, and produces an olefin polymer containing only a small amount of a material (such as a low-molecular weight material and an amorphous material) soluble in a low-temperature organic solvent, (ii) a process for producing a solid catalyst component for olefin polymerization, (iii) a process for producing a solid catalyst for olefin polymerization, and (iv) a process for producing an olefin polymer.

The present invention is a solid catalyst component for olefin polymerization containing a titanium atom, a magnesium atom, a halogen atom, and an internal electron donor represented by formula (I)

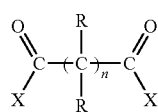

(I)

wherein R is a hydrogen atom, a halogen atom, or a hydrocarbyl group having 1 to 10 carbon atoms, and plural Rs are the same as, or different from one another; X is a halogen atom or a hydrocarbyloxy group having 1 to 10 carbon atoms, and two Xs are the same as, or different from each other; and n is an integer satisfying $10 \leq n \leq 20$.

Also, the present invention is a process for producing the above solid catalyst component for olefin polymerization, comprising a step of contacting a titanium compound, a magnesium compound, and an internal electron donor represented by above formula (I) with one another, or comprising a step of contacting a solid component containing a titanium atom and a magnesium atom with an internal electron donor represented by above formula (I). The above former embodiment contacting a titanium compound, a magnesium compound, and an internal electron donor represented by above formula (I) with one another is hereinafter referred to as "catalyst component production process-1". The above latter embodiment contacting a solid component containing a titanium atom and a magnesium atom with an internal electron donor represented by above formula (I) is hereinafter referred to as "catalyst component production process-2".

Further, the present invention is a process for producing a solid catalyst for olefin polymerization, comprising a step of contacting (i) the above solid catalyst component for olefin polymerization, or a solid catalyst component for olefin polymerization produced by above catalyst component production process-1 or -2, (ii) an organoaluminum compound, and (iii) an optionally-used external electron donor, with one another.

Moreover, the present invention is a process for producing an olefin polymer, comprising a step of polymerizing an olefin in the presence of a solid catalyst for olefin polymerization produced by the above process for producing a solid catalyst for olefin polymerization.

The above "solid catalyst component for olefin polymerization" and "solid catalyst for olefin polymerization" are hereinafter referred to as "solid catalyst component" and "solid catalyst", respectively.

DETAILED DESCRIPTION OF THE INVENTION

Examples of the halogen atom of R in formula (I) are a fluorine atom, a chlorine atom, a bromine atom, and an iodine atom. Among them, preferred is a fluorine atom, a chlorine atom, or a bromine atom.

Examples of the hydrocarbyl group of R in formula (I) are an alkyl group, an aralkyl group, an aryl group, and an alkenyl group. Those groups may carry a substituent such as a halogen atom, a hydrocarbyloxy group, a nitro group, a sulfonyl group, and a silyl group.

Examples of the above alkyl group are a linear alkyl group such as a methyl group, an ethyl group, a n-propyl group, a n-butyl group, a n-pentyl group, a n-hexyl group, a n-heptyl group, and a n-octyl group; a branched alkyl group such as an isopropyl group, an isobutyl group, a tert-butyl group, an isopentyl group, a neopentyl group, and a 2-ethylhexyl group; and a cycloalkyl group such as a cyclopropyl group, a cyclobutyl group, a cyclopentyl group, a cyclohexyl group, a cycloheptyl group, and a cyclooctyl group. Among them, preferred is a linear, branched or cycloalkyl group having 1 to 10 carbon atoms; and more preferred is a linear or branched alkyl group having 1 to 10 carbon atoms.

Examples of the above aralkyl group are a benzyl group and a phenethyl group. Among them, preferred is an aralkyl group having 7 to 10 carbon atoms.

Examples of the above aryl group are a pheny group, a tolyl group, a xylyl group, a mesityl group, and a naphthy group. Among them, preferred is an aryl group having 6 to 10 carbon atoms.

Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is an alkenyl group having 2 to 10 carbon atoms.

R in formula (I) is preferably a hydrogen atom or an alkyl group having 1 to 10 carbon atoms.

Examples of the halogen atom of X in formula (I) are a fluorine atom, a chlorine atom, a bromine atom, and an iodine atom. Among them, preferred is a fluorine atom, a chlorine atom, or a bromine atom.

Examples of the hydrocarbyloxy group of X in formula (I) are an alkoxy group, an aralkyloxy group, an aryloxy group and an alkenyloxy group. Those groups may carry a substituent such as a halogen atom, a nitro group, a sulfonyl group, and a silyl group.

Examples of the above alkoxy group are a linear alkoxy group such as a methoxy group, an ethoxy group, a n-propoxy group, a n-butoxy group, a n-pentyloxy group, a n-hexyloxy group, a n-heptyloxy group, a n-octyloxy group, and a n-decyloxy group; a branched alkoxy group such as an isopropoxy group, an isobutoxy group, a tert-butoxy group, an isopentoxy group, a neopentoxy group, an isoamyloxy group, and a 2-ethylhexyloxy group; and a cycloalkoxy group such as a cyclopropyloxy group, a cyclobutyloxy group, a cyclopentyloxy group, a cyclohexyloxy group, a cycloheptyloxy group, and a cyclooctyloxy group. Among them, preferred is a linear or branched alkoxy group having 1 to 10 carbon atoms.

Examples of the above aralkyloxy group are a benzyloxy group and a phenethyloxy group. Among them, preferred is an aralkyloxy group having 7 to 10 carbon atoms.

Examples of the above aryloxy group are a phenoxy group, a tolyloxy group, a xylyloxy group, a mesityloxy group, and a naphthyoxy group. Among them, preferred is an aryloxy group having 7 to 10 carbon atoms.

Examples of the above alkenyloxy group are a linear alkenyloxy group such as a vinyloxy group, an allyloxy group, a 3-butenyloxy group, and a 5-hexenyloxy group; a branched alkenyloxy group such as an isobutenyloxy group and a 4-methyl-3-pentenyloxy group; and a cycloalkenyloxy group such as a 2-cyclohexenyloxy group and a 3-cyclohexenyloxy group. Among them, preferred is a linear or branched alkenyloxy group having 2 to 10 carbon atoms.

X in formula (I) is preferably a halogen atom, or a linear or branched alkoxy group having 1 to 10 carbon atoms.

In formula (I), n is an integer satisfying $10 \leq n \leq 20$, preferably $10 \leq n \leq 18$, more preferably $10 \leq n \leq 16$, and further preferably $10 \leq n \leq 14$.

Examples of the internal electron donor represented by formula (I), wherein n is 10, are as follows: dimethyl dodecanedioate, diethyl dodecanedioate, dipropyl dodecanedioate, diisopropyl dodecanedioate, dibutyl dodecanedioate, diisobutyl dodecanedioate, dipentyl dodecanedioate, diisopentyl dodecanedioate, dihexyl dodecanedioate, diisohexyl dodecanedioate, diheptyl dodecanedioate, diisoheptyl dodecanedioate, dioctyl dodecanedioate, diisooctyl dodecanedioate, bis(2-ethylhexyl)dodecanedioate, dimethyl α-methyldodecanedioate, diethyl α-methyldodecanedioate, dipropyl α-methyldodecanedioate, diisopropyl α-methyldodecanedioate, dibutyl α-methyldodecanedioate, diisobutyl α-methyldodecanedioate, dipentyl α-methyldodecanedioate, diisopentyl α-methyldodecanedioate, dihexyl α-methyldodecanedioate, diisohexyl α-methyldodecanedioate, diheptyl α-methyldodecanedioate, diisoheptyl α-methyldodecanedioate, dioctyl α-methyldodecanedioate, diisooctyl α-methyldodecanedioate, bis(2-ethylhexyl)α-methyldodecanedioate, dimethyl α-ethyldodecanedioate, diethyl α-ethyldodecanedioate, dipropyl α-ethyldodecanedioate, diisopropyl α-ethyldodecanedioate, dibutyl α-ethyldodecanedioate, diisobutyl α-ethyldodecanedioate, dipentyl α-ethyldodecanedioate, diisopentyl α-ethyldodecanedioate, dihexyl α-ethyldodecanedioate, diisohexyl α-ethyldodecanedioate, diheptyl α-ethyldodecanedioate, diisoheptyl α-ethyldodecanedioate, dioctyl α-ethyldodecanedioate, diisooctyl α-ethyldodecanedioate, bis(2-ethylhexyl)α-ethyldodecanedioate, dimethyl α-isopropyldodecanedioate, diethyl α-isopropyldodecanedioate, dipropyl α-isopropyldodecanedioate, diisopropyl α-isopropyldodecanedioate, dibutyl α-isopropyldodecanedioate, diisobutyl α-isopropyldodecanedioate, dipentyl α-isopropyldodecanedioate, diisopentyl α-isopropyldodecanedioate, dihexyl α-isopropyldodecanedioate, diisohexyl α-isopropyldodecanedioate, diheptyl α-isopropyldodecanedioate, diisoheptyl α-isopropyldodecanedioate, dioctyl α-isopropyldodecanedioate, diisooctyl α-isopropyldodecanedioate, bis(2-ethylhexyl)α-isopropyldodecanedioate, didimethyl β-methyldodecanedioate, diethyl β-methyldodecanedioate, dipropyl β-methyldodecanedioate, diisopropyl β-methyldodecanedioate, dibutyl β-methyldodecanedioate, diisobutyl β-methyldodecanedioate, dipentyl β-methyldodecanedioate, diisopentyl β-methyldodecanedioate, dihexyl β-methyldodecanedioate, diisohexyl β-methyldodecanedioate, diheptyl β-methyldodecanedioate, diisoheptyl β-methyldodecanedioate, dioctyl β-methyldodecanedioate, diisooctyl β-methyldodecanedioate, bis(2-ethylhexyl)β-methyldodecanedioate, dimethyl β-ethyldodecanedioate, diethyl β-ethyldodecanedioate, dipropyl β-ethyldodecanedioate, diisopropyl β-ethyldodecanedioate, dibutyl β-ethyldodecanedioate, diisobutyl β-ethyldodecanedioate, dipentyl β-ethyldodecanedioate, diisopentyl β-ethyldodecanedioate, dihexyl β-ethyldodecanedioate, diisohexyl β-ethyldodecanedioate, diheptyl β-ethyldodecanedioate, diisoheptyl β-ethyldodecanedioate, dioctyl β-ethyldodecanedioate, diisooctyl β-ethyldodecanedioate, bis(2-ethylhexyl)β-ethyldodecanedioate, dimethyl β-isopropyldodecanedioate, diethyl β-isopropyldodecanedioate, dipropyl β-isopropyldodecanedioate, diisopropyl β-isopropyldodecanedioate, dibutyl β-isopropyldodecanedioate, diisobutyl β-isopropyldodecanedioate, dipentyl β-isopropyldodecanedioate, diisopentyl β-isopropyldodecanedioate, dihexyl β-isopropyldodecanedioate, diisohexyl β-isopropyldodecanedioate, diheptyl β-isopropyldodecanedioate, diisoheptyl β-isopropyldodecanedioate, dioctyl β-isopropyldodecanedioate, diisooctyl β-isopropyldodecanedioate, bis(2-ethylhexyl)β-isopropyldodecanedioate, dimethyl γ-methyldodecanedioate, diethyl γ-methyldodecanedioate, dipropyl γ-methyldodecanedioate, diisopropyl γ-methyldodecanedioate, dibutyl γ-methyldodecanedioate, diisobutyl γ-methyldodecanedioate, dipentyl γ-methyldodecanedioate, diisopentyl γ-methyldodecanedioate, dihexyl γ-methyldodecanedioate, diisohexyl γ-methyldodecanedioate, diheptyl γ-methyldodecanedioate, diisoheptyl γ-methyldodecanedioate, dioctyl γ-methyldodecanedioate, diisooctyl γ-methyldodecanedioate, bis(2-ethylhexyl)γ-methyldodecanedioate, dimethyl γ-ethyldodecanedioate, diethyl γ-ethyldodecanedioate, dipropyl γ-ethyldodecanedioate, diisopropyl γ-ethyldodecanedioate, dibutyl γ-ethyldodecanedioate, diisobutyl γ-ethyldodecanedioate, dipentyl γ-ethyldodecanedioate, diisopentyl γ-ethyldodecanedioate, dihexyl γ-ethyldodecanedioate, diisohexyl γ-ethyldodecanedioate, diheptyl γ-ethyldodecanedioate, diisoheptyl γ-ethyldodecanedioate, dioctyl γ-ethyldodecanedioate, diisooctyl γ-ethyldodecanedioate, bis(2-ethylhexyl)γ-ethyldodecanedioate, dimethyl γ-isopropyldodecanedioate, diethyl γ-isopropyldodecanedioate, dipropyl γ-isopropyldodecanedioate, diisopropyl γ-isopropyldodecanedioate, dibutyl γ-isopropyldodecanedioate, diisobutyl γ-isopropyldodecanedioate, dipentyl γ-isopropyldodecanedioate, diisopentyl γ-isopropyldodecanedioate, dihexyl γ-isopropyldodecanedioate, diisohexyl γ-isopropyldodecanedioate, diheptyl γ-isopropyldodecanedioate, diisoheptyl γ-isopropyldodecanedioate, dioctyl γ-isopropyldodecanedioate, diisooctyl γ-isopropyldodecanedioate, bis(2-ethylhexyl)γ-isopropyldodecanedioate, dimethyl α,β-dimethyldodecanedioate, diethyl α,β-dimethyldodecanedioate, dipropyl α,β-dimethyldodecanedioate, diisopropyl α,β-dimethyldodecanedioate, dibutyl α,β-dimethyldodecanedioate, diisobutyl α,β-dimethyldodecanedioate, dipentyl α,β-dimethyldodecanedioate, diisopentyl α,β-dimethyldodecanedioate, dihexyl α,β-dimethyldodecanedioate, diisohexyl α,β-dimethyldodecanedioate, diheptyl α,β-dimethyldodecanedioate, diisoheptyl α,β-dimethyldodecanedioate, dioctyl α,β-dimethyldodecanedioate, diisooctyl α,β-dimethyldodecanedioate, bis(2-ethylhexyl)α,β-dimethyldodecanedioate, dimethyl α,β-diethyldodecanedioate, diethyl α,β-diethyldodecanedioate, dipropyl α,β-diethyldodecanedioate, diisopropyl α,β-diethyldodecanedioate, dibutyl α,β-diethyldodecanedioate, diisobutyl α,β-diethyldodecanedioate, dipentyl α,β-diethyldodecanedioate, diisopentyl α,β-diethyldodecanedioate, dihexyl α,β-diethyldodecanedioate, diisohexyl α,β-diethyldodecanedioate, diheptyl α,β-diethyldodecanedioate, diisoheptyl α,β-diethyldodecanedioate, dioctyl α,β-diethyldodecanedioate, diisooctyl α,β-diethyldodecanedioate, bis(2-ethylhexyl)α,β-diethyldodecanedioate, dimethyl α,β-diisopropyldodecanedioate, diethyl α,β-diisopropyldodecanedioate, dipropyl α,β-diisopropyldodecanedioate, diisopropyl α,β-diisopropyldodecanedioate, dibutyl α,β-diisopropyldodecanedioate, diisobutyl α,β-diisopropyldodecanedioate, dipentyl α,β-diisopropyldodecanedioate, diisopentyl α,β-diisopropyldodecanedioate, dihexyl α,β-diisopropyldodecanedioate, diisohexyl α,β-diisopropyldodecanedioate, diheptyl α,β-diisopropyldodecanedioate, diisoheptyl α,β-diisopropyldodecanedioate, dioctyl α,β-diisopropyldodecanedioate, diisooctyl α,β-diisopropyldodecanedioate, bis(2-ethylhexyl)α,β-diisopropyldodecanedioate, dodecanedioyl dichloride, α-methyldodecanedioyl dichloride, α-ethyldodecanedioyl dichloride, α-isopropyldodecanedioyl dichloride, β-methyldodecanedioyl dichloride, β-ethyldodecanedioyl dichloride, β-isopropyldodecanedioyl dichloride, γ-methyldodecanedioyl dichloride, γ-ethyldodecanedioyl dichloride, γ-isopropyldodecanedioyl dichloride, α,β-dimethyldodecanedioyl dichloride, α,β-diethyldodecanedioyl dichloride, and α,β-diisopropyldodecanedioyl dichloride.

Examples of the internal electron donor represented by formula (I), wherein n is 11, are as follows: dimethyl tridecanedioate, diethyl tridecanedioate, dipropyl tridecanedioate, diisopropyl tridecanedioate, dibutyl tridecanedioate, diisobutyl tridecanedioate, dipentyl tridecanedioate, diisopentyl tridecanedioate, dihexyl tridecanedioate, diisohexyl tridecanedioate, diheptyl tridecanedioate, diisoheptyl tridecanedioate, dioctyl tridecanedioate, diisooctyl tridecanedioate, bis(2-ethylhexyl)tridecanedioate, dimethyl α-methyltridecanedioate, diethyl α-methyltridecanedioate, dipropyl α-methyltridecanedioate, diisopropyl α-methyltridecanedioate, dibutyl α-methyltridecanedioate, diisobutyl α-methyltridecanedioate, dipentyl α-methyltridecanedioate, diisopentyl α-methyltridecanedioate, dihexyl α-methyltridecanedioate, diisohexyl α-methyltridecanedioate, diheptyl α-methyltridecanedioate, diisoheptyl α-methyltridecanedioate, dioctyl α-methyltridecanedioate, diisooctyl α-methyltridecanedioate, bis(2-ethylhexyl)α-methyltridecanedioate, dimethyl α-ethyltridecanedioate, diethyl α-ethyltridecanedioate, dipropyl α-ethyltridecanedioate, diisopropyl α-ethyltridecanedioate, dibutyl α-ethyltridecanedioate, diisobutyl α-ethyltridecanedioate, dipentyl α-ethyltridecanedioate, diisopentyl α-ethyltridecanedioate, dihexyl α-ethyltridecanedioate, diisohexyl α-ethyltridecanedioate, diheptyl α-ethyltridecanedioate, diisoheptyl α-ethyltridecanedioate, dioctyl α-ethyltridecanedioate, diisooctyl α-ethyltridecanedioate, bis(2-ethylhexyl)α-ethyltridecanedioate, dimethyl α-isopropyltridecanedioate, diethyl α-isopropyltridecanedioate, dipropyl α-isopropyltridecanedioate, diisopropyl α-isopropyltridecanedioate, dibutyl α-isopropyltridecanedioate, diisobutyl α-isopropyltridecanedioate, dipentyl α-isopropyltridecanedioate, diisopentyl α-isopropyltridecanedioate, dihexyl α-isopropyltridecanedioate, diisohexyl α-isopropyltridecanedioate, diheptyl α-isopropyltridecanedioate, diisoheptyl α-isopropyltridecanedioate, dioctyl α-isopropyltridecanedioate, diisooctyl α-isopropyltridecanedioate, bis(2-ethylhexyl)α-isopropyltridecanedioate, didimethyl β-methyltridecanedioate, diethyl β-methyltridecanedioate, dipropyl β-methyltridecanedioate, diisopropyl β-methyltridecanedioate, dibutyl β-methyltridecanedioate, diisobutyl β-methyltridecanedioate, dipentyl β-methyltridecanedioate, diisopentyl β-methyltridecanedioate, dihexyl β-methyltridecanedioate, diisohexyl β-methyltridecanedioate, diheptyl β-methyltridecanedioate, diisoheptyl β-methyltridecanedioate, dioctyl β-methyltridecanedioate, diisooctyl β-methyltridecanedioate, bis(2-ethylhexyl)β-methyltridecanedioate, dimethyl β-ethyltridecanedioate, diethyl β-ethyltridecanedioate, dipropyl β-ethyltridecanedioate, diisopropyl β-ethyltridecanedioate, dibutyl β-ethyltridecanedioate, diisobutyl β-ethyltridecanedioate, dipentyl β-ethyltridecanedioate, diisopentyl β-ethyltridecanedioate, dihexyl β-ethyltridecanedioate, diisohexyl β-ethyltridecanedioate, diheptyl β-ethyltridecanedioate, diisoheptyl β-ethyltridecanedioate, dioctyl β-ethyltridecanedioate, diisooctyl β-ethyltridecanedioate, bis(2-ethylhexyl)β-ethyltridecanedioate, dimethyl β-isopropyltridecanedioate, diethyl β-isopropyltridecanedioate, dipropyl β-isopropyltridecanedioate, diisopropyl β-isopropyltridecanedioate, dibutyl β-isopropyltridecanedioate, diisobutyl β-isopropyltridecanedioate, dipentyl β-isopropyltridecanedioate, diisopentyl β-isopropyltridecanedioate, dihexyl β-isopropyltridecanedioate, diisohexyl β-isopropyltridecanedioate, diheptyl β-isopropyltridecanedioate, diisoheptyl β-isopropyltridecanedioate, dioctyl β-isopropyltridecanedioate, diisooctyl β-isopropyltridecanedioate, bis(2-ethylhexyl)β-isopropyltridecanedioate, dimethyl γ-methyltridecanedioate, diethyl γ-methyltridecanedioate, dipropyl γ-methyltridecanedioate, diisopropyl γ-methyltridecanedioate, dibutyl γ-methyltridecanedioate, diisobutyl γ-methyltridecanedioate, dipentyl γ-methyltridecanedioate, diisopentyl γ-methyltridecanedioate, dihexyl γ-methyltridecanedioate, diisohexyl γ-methyltridecanedioate, diheptyl γ-methyltridecanedioate, diisoheptyl γ-methyltridecanedioate, dioctyl γ-methyltridecanedioate, diisooctyl γ-methyltridecanedioate, bis(2-ethylhexyl)γ-methyltridecanedioate, dimethyl γ-ethyltridecanedioate, diethyl γ-ethyltridecanedioate, dipropyl γ-ethyltridecanedioate, diisopropyl γ-ethyltridecanedioate, dibutyl γ-ethyltridecanedioate, diisobutyl γ-ethyltridecanedioate, dipentyl γ-ethyltridecanedioate, diisopentyl γ-ethyltridecanedioate, dihexyl γ-ethyltridecanedioate, diisohexyl γ-ethyltridecanedioate, diheptyl γ-ethyltridecanedioate, diisoheptyl γ-ethyltridecanedioate, dioctyl γ-ethyltridecanedioate, diisooctyl γ-ethyltridecanedioate, bis(2-ethylhexyl)γ-ethyltridecanedioate, dimethyl γ-isopropyltridecanedioate, diethyl γ-isopropyltridecanedioate, dipropyl γ-isopropyltridecanedioate, diisopropyl γ-isopropyltridecanedioate, dibutyl γ-isopropyltridecanedioate, diisobutyl γ-isopropyltridecanedioate, dipentyl γ-isopropyltridecanedioate, diisopentyl γ-isopropyltridecanedioate, dihexyl γ-isopropyltridecanedioate, diisohexyl γ-isopropyltridecanedioate, diheptyl γ-isopropyltridecanedioate, diisoheptyl γ-isopropyltridecanedioate, dioctyl γ-isopropyltridecanedioate, diisooctyl γ-isopropyltridecanedioate, bis(2-ethylhexyl)γ-isopropyltridecanedioate, dimethyl α,β-dimethyltridecanedioate, diethyl α,β-dimethyltridecanedioate, dipropyl α,β-dimethyltridecanedioate, diisopropyl α,β-dimethyltridecanedioate, dibutyl α,β-dimethyltridecanedioate, diisobutyl α,β-dimethyltridecanedioate, dipentyl α,β-dimethyltridecanedioate, diisopentyl α,β-dimethyltridecanedioate, dihexyl α,β-dimethyltridecanedioate, diisohexyl α,β-dimethyltridecanedioate, diheptyl α,β-dimethyltridecanedioate, diisoheptyl α,β-dimethyltridecanedioate, dioctyl α,β-dimethyltridecanedioate, diisooctyl α,β-dimethyltridecanedioate, bis(2-ethylhexyl)α,β-dimethyltridecanedioate, dimethyl α,β-diethyltridecanedioate, diethyl α,β-diethyltridecanedioate, dipropyl α,β-diethyltridecanedioate, diisopropyl α,β-diethyltridecanedioate, dibutyl α,β-diethyltridecanedioate, diisobutyl α,β-diethyltridecanedioate, dipentyl α,β-diethyltridecanedioate, diisopentyl α,β-diethyltridecanedioate, dihexyl α,β-diethyltridecanedioate, diisohexyl α,β-diethyltridecanedioate, diheptyl α,β-diethyltridecanedioate, diisoheptyl α,β-diethyltridecanedioate, dioctyl α,β-diethyltridecanedioate, diisooctyl α,β-diethyltridecanedioate, bis(2-ethylhexyl)α,β-diethyltridecanedioate, dimethyl α,β-diisopropyltridecanedioate, diethyl α,β-diisopropyltridecanedioate, dipropyl α,β-diisopropyltridecanedioate, diisopropyl α,β-diisopropyltridecanedioate, dibutyl α,β-diisopropyltridecanedioate, diisobutyl α,β-diisopropyltridecanedioate, dipentyl α,β-diisopropyltridecanedioate, diisopentyl α,β-diisopropyltridecanedioate, dihexyl α,β-diisopropyltridecanedioate, diisohexyl α,β-diisopropyltridecanedioate, diheptyl α,β-diisopropyltridecanedioate, diisoheptyl α,β-diisopropyltridecanedioate, dioctyl α,β-diisopropyltridecanedioate, diisooctyl α,β-diisopropyltridecanedioate, bis(2-ethylhexyl)α,β-diisopropyltridecanedioate, tridecanedioyl dichloride, α-methyltridecanedioyl dichloride, α-ethyltridecanedioyl dichloride, α-isopropyltridecanedioyl dichloride, β-methyltridecanedioyl dichloride, β-ethyltridecanedioyl dichloride, β-isopropyltridecanedioyl dichloride, γ-methyltridecanedioyl dichloride, γ-ethyltridecanedioyl dichloride, γ-isopropyltridecanedioyl dichloride, α,β-dimethyltridecanedioyl dichloride, α,β-diethyltridecanedioyl dichloride, and α,β-diisopropyltridecanedioyl dichloride.

Examples of the internal electron donor represented by formula (I), wherein n is 12, are as follows: dimethyl tetradecanedioate, diethyl tetradecanedioate, dipropyl tetradecanedioate, diisopropyl tetradecanedioate, dibutyl tetradecanedioate, diisobutyl tetradecanedioate, dipentyl tetradecanedioate, diisopentyl tetradecanedioate, dihexyl tetradecanedioate, diisohexyl tetradecanedioate, diheptyl tetradecanedioate, diisoheptyl tetradecanedioate, dioctyl tetradecanedioate, diisooctyl tetradecanedioate, bis(2-ethylhexyl)tetradecanedioate, dimethyl α-methyltetradecanedioate, diethyl α-methyltetradecanedioate, dipropyl α-methyltetradecanedioate, diisopropyl α-methyltetradecanedioate, dibutyl α-methyltetradecanedioate, diisobutyl α-methyltetradecanedioate, dipentyl α-methyltetradecanedioate, diisopentyl α-methyltetradecanedioate, dihexyl α-methyltetradecanedioate, diisohexyl α-methyltetradecanedioate, diheptyl α-methyltetradecanedioate, diisoheptyl α-methyltetradecanedioate, dioctyl α-methyltetradecanedioate, diisooctyl α-methyltetradecanedioate, bis(2-ethylhexyl)α-methyltetradecanedioate, dimethyl α-ethyltetradecanedioate, diethyl α-ethyltetradecanedioate, dipropyl α-ethyltetradecanedioate, diisopropyl α-ethyltetradecanedioate, dibutyl α-ethyltetradecanedioate, diisobutyl α-ethyltetradecanedioate, dipentyl α-ethyltetradecanedioate, diisopentyl α-ethyltetradecanedioate, dihexyl α-ethyltetradecanedioate, diisohexyl α-ethyltetradecanedioate, diheptyl α-ethyltetradecanedioate, diisoheptyl α-ethyltetradecanedioate, dioctyl α-ethyltetradecanedioate, diisooctyl α-ethyltetradecanedioate, bis(2-ethylhexyl)α-ethyltetradecanedioate, dimethyl α-isopropyltetradecanedioate, diethyl α-isopropyltetradecanedioate, dipropyl α-isopropyltetradecanedioate, diisopropyl α-isopropyltetradecanedioate, dibutyl α-isopropyltetradecanedioate, diisobutyl α-isopropyltetradecanedioate, dipentyl α-isopropyltetradecanedioate, diisopentyl α-isopropyltetradecanedioate, dihexyl α-isopropyltetradecanedioate, diisohexyl α-isopropyltetradecanedioate, diheptyl α-isopropyltetradecanedioate, diisoheptyl α-isopropyltetradecanedioate, dioctyl α-isopropyltetradecanedioate, diisooctyl α-isopropyltetradecanedioate, bis(2-ethylhexyl)α-isopropyltetradecanedioate, didimethyl β-methyltetradecanedioate, diethyl β-methyltetradecanedioate, dipropyl β-methyltetradecanedioate, diisopropyl β-methyltetradecanedioate, dibutyl β-methyltetradecanedioate, diisobutyl β-methyltetradecamedioate, dipentyl β-methyltetradecanedioate, diisopentyl β-methyltetradecanedioate, dihexyl β-methyltetradecanedioate, diisohexyl β-methyltetradecanedioate, diheptyl β-methyltetradecanedioate, diisoheptyl β-methyltetradecanedioate, dioctyl β-methyltetradecanedioate, diisooctyl β-methyltetradecanedioate, bis(2-ethylhexyl)β-methyltetradecanedioate, dimethyl β-ethyltetradecanedioate, diethyl β-ethyltetradecanedioate, dipropyl β-ethyltetradecanedioate, diisopropyl β-ethyltetradecanedioate, dibutyl β-ethyltetradecanedioate, diisobutyl β-ethyltetradecanedioate, dipentyl β-ethyltetradecanedioate, diisopentyl β-ethyltetradecanedioate, dihexyl β-ethyltetradecanedioate, diisohexyl β-ethyltetradecanedioate, diheptyl β-ethyltetradecanedioate, diisoheptyl β-ethyltetradecanedioate, dioctyl β-ethyltetradecanedioate, diisooctyl β-ethyltetradecanedioate, bis(2-ethylhexyl)β-ethyltetradecanedioate, dimethyl β-isopropyltetradecanedioate, diethyl β-isopropyltetradecanedioate, ipropyl β-isopropyltetradecamedopate, diisopropyl β-isopropyltetradecanedioate, dibutyl β-isopropyltetradecanedioate, diisobutyl β-isopropyltetradecanedioate, dipentyl β-isopropyltetradecanedioate, diisopentyl β-isopropyltetradecanedioate, dihexyl β-isopropyltetradecanedioate, diisohexyl β-isopropyltetradecanedioate, diheptyl β-isopropyltetradecanedioate, diisoheptyl β-isopropyltetradecanedioate, dioctyl β-isopropyltetradecanedioate, diisooctyl β-isopropyltetradecanedioate, bis(2-ethylhexyl)β-isopropyltetradecanedioate, dimethyl γ-methyltetradecanedioate, diethyl γ-methyltetradecanedioate, dipropyl γ-methyltetradecanedioate, diisopropyl γ-methyltetradecanedioate, dibutyl γ-methyltetradecanedioate, diisobutyl γ-methyltetradecanedioate, dipentyl γ-methyltetradecanedioate, diisopentyl γ-methyltetradecanedioate, dihexyl γ-methyltetradecanedioate, diisohexyl γ-methyltetradecanedioate, diheptyl γ-methyltetradecanedioate, diisoheptyl γ-methyltetradecanedioate, dioctyl γ-methyltetradecanedioate, diisooctyl γ-methyltetradecanedioate, bis(2-ethylhexyl) γ-methyltetradecanedioate, dimethyl γ-ethyltetradecanedioate, diethyl γ-ethyltetradecanedioate, dipropyl γ-ethyltetradecanedioate, diisopropyl γ-ethyltetradecanedioate, dibutyl γ-ethyltetradecanedioate, diisobutyl γ-ethyltetradecanedioate, dipentyl γ-ethyltetradecanedioate, diisopentyl γ-ethyltetradecanedioate, dihexyl γ-ethyltetradecanedioate, diisohexyl γ-ethyltetradecanedioate, diheptyl γ-ethyltetradecanedioate, diisoheptyl γ-ethyltetradecanedioate, dioctyl γ-ethyltetradecanedioate, diisooctyl γ-ethyltetradecanedioate, bis(2-ethylhexyl)γ-ethyltetradecanedioate, dimethyl γ-isopropyltetradecanedioate, diethyl γ-isopropyltetradecanedioate, dipropyl γ-isopropyltetradecanedioate, diisopropyl γ-isopropyltetradecanedioate, dibutyl γ-isopropyltetradecanedioate, diisobutyl γ-isopropyltetradecanedioate, dipentyl γ-isopropyltetradecanedioate, diisopentyl γ-isopropyltetradecanedioate, dihexyl γ-isopropyltetradecanedioate, diisohexyl γ-isopropyltetradecanedioate, diheptyl γ-isopropyltetradecamedioate, diisoheptyl γ-isopropyltetradecanedioate, dioctyl γ-isopropyltetradecanedioate, diisooctyl γ-isopropyltetradecanedioate, bis(2-ethylhexyl)γ-isopropyltetradecanedioate, dimethyl α,β-dimethyltetradecanedioate, diethyl α,β-dimethyltetradecanedioate, dipropyl α,β-dimethyltetradecanedioate, diisopropyl α,β-dimethyltetradecanedioate, dibutyl α,β-dimethyltetradecanedioate, diisobutyl α,β-dimethyltetradecanedioate, dipentyl α,β-dimethyltetradecanedioate, diisopentyl α,β-dimethyltetradecanedioate, dihexyl α,β-dimethyltetradecanedioate, diisohexyl α,β-dimethyltetradecanedioate, diheptyl α,β-dimethyltetradecanedioate, diisoheptyl α,β-dimethyltetradecanedioate, dioctyl α,β-dimethyltetradecanedioate, diisooctyl α,β-dimethyltetradecanedioate, bis(2-ethylhexyl)α,β-dimethyltetradecanedioate, dimethyl α,β-diethyltetradecanedioate, diethyl α,β-diethyltetradecanedioate, dipropyl α,β-diethyltetradecanedioate, diisopropyl α,β-diethyltetradecanedioate, dibutyl α,β-diethyltetradecanedioate, diisobutyl α,β-diethyltetradecanedioate, dipentyl α,β-diethyltetradecanedioate, diisopentyl α,β-diethyltetradecanedioate, dihexyl α,β-diethyltetradecanedioate, diisohexyl α,β-diethyltetradecanedioate, diheptyl α,β-diethyltetradecanedioate, diisoheptyl α,β-diethyltetradecanedioate, dioctyl α,β-diethyltetradecanedioate, diisooctyl α,β-diethyltetradecanedioate, bis(2-ethylhexyl)α,β-diethyltetradecanedioate, dimethyl α,β-diisopropyltetradecanedioate, diethyl α,β-diisopropyltetradecanedioate, dipropyl α,β-diisopropyltetradecanedioate, diisopropyl α,β-diisopropyltetradecanedioate, dibutyl α,β-diisopropyltetradecanedioate, diisobutyl α,β-diisopropyltetradecanedioate, dipentyl α,β-diisopropyltetradecanedioate, diisopentyl α,β-diisopropyltetradecanedioate, dihexyl α,β-diisopropyltetradecanedioate, diisohexyl α,β-diisopropyltetradecanedioate, diheptyl α,β-diisopropyltetradecanedioate, diisoheptyl α,β-diisopropyltetradecanedioate, dioctyl α,β-diisopropyltetradecanedioate, diisooctyl α,β-diisopropyltetradecanedioate, bis(2-ethylhexyl)α,β-diisopropyltetradecanedioate, tetradecanedioyl dichloride, α-methyltetradecanedioyl dichloride, α-ethyltetradecanedioyl dichloride, α-isopropyltetradecanedioyl dichloride, β-methyltetradecanedioyl dichloride, β-ethyltetradecanedioyl dichloride, β-isopropyltetradecanedioyl dichloride, γ-methyltetradecanedioyl dichloride, γ-ethyltetradecanedioyl dichloride, γ-isopropyltetradecanedioyl dichloride, α,β-dimethyltetradecanedioyl dichloride, α,β-diethyltetradecanedioyl dichloride, and α,β-diisopropyltetradecanedioyl dichloride.

Examples of the internal electron donor represented by formula (I), wherein n is 13, are as follows: dimethyl pentadecanedioate, diethyl pentadecanedioate, dipropyl pentadecanedioate, diisopropyl pentadecanedioate, dibutyl pentadecanedioate, diisobutyl pentadecanedioate, dipentyl pentadecanedioate, diisopentyl pentadecanedioate, dihexyl pentadecanedioate, diisohexyl pentadecanedioate, diheptyl pentadecanedioate, diisoheptyl pentadecanedioate, dioctyl pentadecanedioate, diisooctyl pentadecanedioate, bis(2-ethylhexyl)pentadecanedioate, dimethyl α-methylpentadecanedioate, diethyl α-methylpentadecanedioate, dipropyl α-methylpentadecanedioate, diisopropyl α-methylpentadecanedioate, dibutyl α-methylpentadecanedioate, diisobutyl α-methylpentadecanedioate, dipentyl α-methylpentadecanedioate, diisopentyl α-methylpentadecanedioate, dihexyl α-methylpentadecanedioate, diisohexyl α-methylpentadecanedioate, diheptyl α-methylpentadecanedioate, diisoheptyl α-methylpentadecanedioate, dioctyl α-methylpentadecanedioate, diisooctyl α-methylpentadecanedioate, bis(2-ethylhexyl)α-methylpentadecanedioate, dimethyl α-ethylpentadecanedioate, diethyl α-ethylpentadecanedioate, dipropyl α-ethylpentadecanedioate, diisopropyl α-ethylpentadecanedioate, dibutyl α-ethylpentadecanedioate, diisobutyl α-ethylpentadecanedioate, dipentyl α-ethylpentadecanedioate, diisopentyl α-ethylpentadecanedioate, dihexyl α-ethylpentadecanedioate, diisohexyl α-ethylpentadecanedioate, diheptyl α-ethylpentadecanedioate, diisoheptyl α-ethylpentadecanedioate, dioctyl α-ethylpentadecanedioate, diisooctyl α-ethylpentadecanedioate, bis(2-ethylhexyl) α-ethylpentadecanedioate, dimethyl α-isopropylpentadecanedioate, diethyl α-isopropylpentadecanedioate, dipropyl α-isopropylpentadecanedioate, diisopropyl α-isopropylpentadecanedioate, dibutyl α-isopropylpentadecanedioate, diisobutyl α-isopropylpentadecanedioate, dipentyl α-isopropylpentadecanedioate, diisopentyl α-isopropylpentadecanedioate, dihexyl α-isopropylpentadecanedioate, diisohexyl α-isopropylpentadecanedioate, diheptyl α-isopropylpentadecanedioate, diisoheptyl α-isopropylpentadecanedioate, dioctyl α-isopropylpentadecanedioate, diisooctyl α-isopropylpentadecanedioate, bis(2-ethylhexyl) α-isopropylpentadecanedioate, didimethyl β-methylpentadecanedioate, diethyl β-methylpentadecanedioate, dipropyl β-methylpentadecanedioate, diisopropyl β-methylpentadecanedioate, dibutyl β-methylpentadecanedioate, diisobutyl β-methylpentadecanedioate, dipentyl β-methylpentadecanedioate, diisopentyl β-methylpentadecanedioate, dihexyl β-methylpentadecanedioate, diisohexyl β-methylpentadecanedioate, diheptyl β-methylpentadecanedioate, diisoheptyl β-methylpentadecanedioate, dioctyl β-methylpentadecanedioate, diisooctyl β-methylpentadecanedioate, bis(2-ethylhexyl)β-methylpentadecanedioate, dimethyl β-ethylpentadecanedioate, diethyl β-ethylpentadecanedioate, dipropyl β-ethylpentadecanedioate, diisopropyl β-ethylpentadecanedioate, dibutyl β-ethylpentadecanedioate, diisobutyl β-ethylpentadecanedioate, dipentyl β-ethylpentadecanedioate, diisopentyl β-ethylpentadecanedioate, dihexyl β-ethylpentadecanedioate, diisohexyl β-ethylpentadecanedioate, diheptyl β-ethylpentadecanedioate, diisoheptyl β-ethylpentadecanedioate, dioctyl β-ethylpentadecanedioate, diisooctyl β-ethylpentadecanedioate, bis(2-ethylhexyl)β-ethylpentadecanedioate, dimethyl β-isopropylpentadecanedioate, diethyl β-isopropylpentadecanedioate, dipropyl β-isopropylpentadecanedioate, diisopropyl β-isopropylpentadecanedioate, dibutyl β-isopropylpentadecanedioate, diisobutyl β-isopropylpentadecanedioate, dipentyl β-isopropylpentadecanedioate, diisopentyl β-isopropylpentadecanedioate, dihexyl β-isopropylpentadecanedioate, diisohexyl β-isopropylpentadecanedioate, diheptyl β-isopropylpentadecanedioate, diisoheptyl β-isopropylpentadecanedioate, dioctyl β-isopropylpentadecanedioate, diisooctyl β-isopropylpentadecanedioate, bis(2-ethylhexyl)β-isopropylpentadecanedioate, dimethyl γ-methylpentadecanedioate, diethyl γ-methylpentadecanedioate, dipropyl γ-methylpentadecanedioate, diisopropyl γ-methylpentadecanedioate, dibutyl γ-methylpentadecanedioate, diisobutyl γ-methylpentadecanedioate, dipentyl γ-methylpentadecanedioate, diisopentyl γ-methylpentadecanedioate, dihexyl γ-methylpentadecanedioate, diisohexyl γ-methylpentadecanedioate, diheptyl γ-methylpentadecanedioate, diisoheptyl γ-methylpentadecanedioate, dioctyl γ-methylpentadecanedioate, diisooctyl γ-methylpentadecanedioate, bis(2-ethylhexyl)γ-methylpentadecanedioate, dimethyl γ-ethylpentadecanedioate, diethyl γ-ethylpentadecanedioate, dipropyl γ-ethylpentadecanedioate, diisopropyl γ-ethylpentadecanedioate, dibutyl γ-ethylpentadecanedioate, diisobutyl γ-ethylpentadecanedioate, dipentyl γ-ethylpentadecanedioate, diisopentyl γ-ethylpentadecanedioate, dihexyl γ-ethylpentadecanedioate, diisohexyl γ-ethylpentadecanedioate, diheptyl γ-ethylpentadecanedioate, diisoheptyl γ-ethylpentadecanedioate, dioctyl γ-ethylpentadecanedioate, diisooctyl γ-ethylpentadecanedioate, bis(2-ethylhexyl)γ-ethylpentadecanedioate, dimethyl γ-isopropylpentadecanedioate, diethyl γ-isopropylpentadecanedioate, dipropyl γ-isopropylpentadecanedioate, diisopropyl γ-isopropylpentadecanedioate, dibutyl γ-isopropylpentadecanedioate, diisobutyl γ-isopropylpentadecanedioate, dipentyl γ-isopropylpentadecanedioate, diisopentyl γ-isopropylpentadecanedioate, dihexyl γ-isopropylpentadecanedioate, diisohexyl γ-isopropylpentadecanedioate, diheptyl γ-isopropylpentadecanedioate, diisoheptyl γ-isopropylpentadecanedioate, dioctyl γ-isopropylpentadecanedioate, diisooctyl γ-isopropylpentadecanedioate, bis(2-ethylhexyl)γ-isopropylpentadecanedioate, dimethyl α,β-dimethylpentadecanedioate, diethyl α,β-dimethylpentadecanedioate, dipropyl α,β-dimethylpentadecanedioate, diisopropyl α,β-dimethylpentadecanedioate, dibutyl α,β-dimethylpentadecanedioate, diisobutyl α,β-dimethylpentadecanedioate, dipentyl α,β-dimethylpentadecanedioate, diisopentyl α,β-dimethylpentadecanedioate, dihexyl α,β-dimethylpentadecanedioate, diisohexyl α,β-dimethylpentadecanedioate, diheptyl α,β-dimethylpentadecanedioate, diisoheptyl α,β-dimethylpentadecanedioate, dioctyl α,β-dimethylpentadecanedioate, diisooctyl α,β-dimethylpentadecanedioate, bis(2-ethylhexyl)α,β-dimethylpentadecanedioate, dimethyl α,β-diethylpentadecanedioate, diethyl α,β-diethylpentadecanedioate, dipropyl α,β-diethylpentadecanedioate, diisopropyl α,β-diethylpentadecanedioate, dibutyl α,β-diethylpentadecanedioate, diisobutyl α,β-diethylpentadecanedioate, dipentyl α,β-diethylpentadecanedioate, diisopentyl α,β-diethylpentadecanedioate, dihexyl α,β-diethylpentadecanedioate, diisohexyl α,β-diethylpentadecanedioate, diheptyl α,β-diethylpentadecanedioate, diisoheptyl α,β-diethylpentadecanedioate, dioctyl α,β-diethylpentadecanedioate, diisooctyl α,β-diethylpentadecanedioate, bis(2-ethylhexyl)α,β-diethylpentadecanedioate, dimethyl α,β-diisopropylpentadecanedioate, diethyl α,β-diisopropylpentadecanedioate, dipropyl α,β-diisopropylpentadecanedioate, diisopropyl α,β-diisopropylpentadecanedioate, dibutyl α,β-diisopropylpentadecanedioate, diisobutyl α,β-diisopropylpentadecanedioate, dipentyl α,β-diisopropylpentadecanedioate, diisopentyl α,β-diisopropylpentadecanedioate, dihexyl α,β-diisopropylpentadecanedioate, diisohexyl α,β-diisopropylpentadecanedioate, diheptyl α,β-diisopropylpentadecanedioate, diisoheptyl α,β-diisopropylpentadecanedioate, dioctyl α,β-diisopropylpentadecanedioate, diisooctyl α,β-diisopropylpentadecanedioate, bis(2-ethylhexyl)α,β-diisopropylpentadecanedioate, pentadecanedioyl dichloride, α-methylpentadecanedioyl dichloride, α-ethylpentadecanedioyl dichloride, α-isopropylpentadecanedioyl dichloride, β-methylpentadecanedioyl dichloride, β-ethylpentadecanedioyl dichloride, β-isopropylpentadecanedioyl dichloride, γ-methylpentadecanedioyl dichloride, γ-ethylpentadecanedioyl dichloride, γ-isopropylpentadecanedioyl dichloride, α,β-dimethylpentadecanedioyl dichloride, α,β-diethylpentadecanedioyl dichloride, and α,β-diisopropylpentadecanedioyl dichloride.

Examples of the internal electron donor represented by formula (I), wherein n is 14, are as follows: dimethyl hexadecanedioate, diethyl hexadecanedioate, dipropyl hexadecanedioate, diisopropyl hexadecanedioate, dibutyl hexadecanedioate, diisobutyl hexadecanedioate, dipentyl hexadecanedioate, diisopentyl hexadecanedioate, dihexyl hexadecanedioate, diisohexyl hexadecanedioate, diheptyl hexadecanedioate, diisoheptyl hexadecanedioate, dioctyl hexadecanedioate, diisooctyl hexadecanedioate, bis(2-ethylhexyl)hexadecanedioate, dimethyl α-methylhexadecanedioate, diethyl α-methylhexadecanedioate, dipropyl α-methylhexadecanedioate, diisopropyl α-methylhexadecanedioate, dibutyl α-methylhexadecanedioate, diisobutyl α-methylhexadecanedioate, dipentyl α-methylhexadecanedioate, diisopentyl α-methylhexadecanedioate, dihexyl α-methylhexadecanedioate, diisohexyl α-methylhexadecanedioate, diheptyl α-methylhexadecanedioate, diisoheptyl α-methylhexadecanedioate, dioctyl α-methylhexadecanedioate, diisooctyl α-methylhexadecanedioate, bis(2-ethylhexyl)α-methylhexadecanedioate, dimethyl α-ethylhexadecanedioate, diethyl α-ethylhexadecanedioate, dipropyl α-ethylhexadecanedioate, diisopropyl α-ethylhexadecanedioate, dibutyl α-ethylhexadecanedioate, diisobutyl α-ethylhexadecanedioate, dipentyl α-ethylhexadecanedioate, diisopentyl α-ethylhexadecanedioate, dihexyl α-ethylhexadecanedioate, diisohexyl α-ethylhexadecanedioate, diheptyl α-ethylhexadecanedioate, diisoheptyl α-ethylhexadecanedioate, dioctyl α-ethylhexadecanedioate, diisooctyl α-ethylhexadecanedioate, bis(2-ethylhexyl)α-ethylhexadecanedioate, dimethyl α-isopropylhexadecanedioate, diethyl α-isopropylhexadecanedioate, dipropyl α-isopropylhexadecanedioate, diisopropyl α-isopropylhexadecanedioate, dibutyl α-isopropylhexadecanedioate, diisobutyl α-isopropylhexadecanedioate, dipentyl α-isopropylhexadecanedioate, diisopentyl α-isopropylhexadecanedioate, dihexyl α-isopropylhexadecanedioate, diisohexyl α-isopropylhexadecanedioate, diheptyl α-isopropylhexadecanedioate, diisoheptyl α-isopropylhexadecanedioate, dioctyl α-isopropylhexadecanedioate, diisooctyl α-isopropylhexadecanedioate, bis(2-ethylhexyl)α-isopropylhexadecanedioate, didimethyl β-methylhexadecanedioate, diethyl β-methylhexadecanedioate, dipropyl β-methylhexadecanedioate, diisopropyl β-methylhexadecanedioate, dibutyl β-methylhexadecanedioate, diisobutyl β-methylhexadecanedioate, dipentyl β-methylhexadecanedioate, diisopentyl β-methylhexadecanedioate, dihexyl β-methylhexadecanedioate, diisohexyl β-methylhexadecanedioate, diheptyl β-methylhexadecanedioate, diisoheptyl β-methylhexadecanedioate, dioctyl β-methylhexadecanedioate, diisooctyl β-methylhexadecanedioate, bis(2-ethylhexyl)β-methylhexadecanedioate, dimethyl β-ethylhexadecanedioate, diethyl β-ethylhexadecanedioate, dipropyl β-ethylhexadecanedioate, diisopropyl β-ethylhexadecanedioate, dibutyl β-ethylhexadecanedioate, diisobutyl β-ethylhexadecanedioate, dipentyl β-ethylhexadecanedioate, diisopentyl β-ethylhexadecanedioate, dihexyl β-ethylhexadecanedioate, diisohexyl β-ethylhexadecanedioate, diheptyl β-ethylhexadecanedioate, diisoheptyl β-ethylhexadecanedioate, dioctyl β-ethylhexadecanedioate, diisooctyl β-ethylhexadecanedioate, bis(2-ethylhexyl)β-ethylhexadecanedioate, dimethyl β-isopropylhexadecanedioate, diethyl β-isopropylhexadecanedioate, dipropyl β-isopropylhexadecanedioate, diisopropyl β-isopropylhexadecanedioate, dibutyl β-isopropylhexadecanedioate, diisobutyl β-isopropylhexadecanedioate, dipentyl β-isopropylhexadecanedioate, diisopentyl β-isopropylhexadecanedioate, dihexyl β-isopropylhexadecanedioate, diisohexyl β-isopropylhexadecanedioate, diheptyl β-isopropylhexadecanedioate, diisoheptyl β-isopropylhexadecanedioate, dioctyl β-isopropylhexadecanedioate, diisooctyl β-isopropylhexadecanedioate, bis(2-ethylhexyl)β-isopropylhexadecanedioate, dimethyl γ-methylhexadecanedioate, diethyl γ-methylhexadecanedioate, dipropyl γ-methylhexadecanedioate, diisopropyl γ-methylhexadecanedioate, dibutyl γ-methylhexadecanedioate, diisobutyl γ-methylhexadecanedioate, dipentyl γ-methylhexadecanedioate, diisopentyl γ-methylhexadecanedioate, dihexyl γ-methylhexadecanedioate, diisohexyl γ-methylhexadecanedioate, diheptyl γ-methylhexadecanedioate, diisoheptyl γ-methylhexadecanedioate, dioctyl γ-methylhexadecanedioate, diisooctyl γ-methylhexadecanedioate, bis(2-ethylhexyl)γ-methylhexadecanedioate, dimethyl γ-ethylhexadecanedioate, diethyl γ-ethylhexadecanedioate, dipropyl γ-ethylhexadecanedioate, diisopropyl γ-ethylhexadecanedioate, dibutyl γ-ethylhexadecanedioate, diisobutyl γ-ethylhexadecanedioate, dipentyl γ-ethylhexadecanedioate, diisopentyl γ-ethylhexadecanedioate, dihexyl γ-ethylhexadecanedioate, diisohexyl γ-ethylhexadecanedioate, diheptyl γ-ethylhexadecanedioate, diisoheptyl γ-ethylhexadecanedioate, dioctyl γ-ethylhexadecanedioate, diisooctyl γ-ethylhexadecanedioate, bis(2-ethylhexyl)γ-ethylhexadecanedioate, dimethyl γ-isopropylhexadecanedioate, diethyl γ-isopropylhexadecanedioate, dipropyl γ-isopropylhexadecanedioate, diisopropyl γ-isopropylhexadecanedioate, dibutyl γ-isopropylhexadecanedioate, diisobutyl γ-isopropylhexadecanedioate, dipentyl γ-isopropylhexadecanedioate, diisopentyl γ-isopropylhexadecanedioate, dihexyl γ-isopropylhexadecanedioate, diisohexyl γ-isopropylhexadecanedioate, diheptyl γ-isopropylhexadecanedioate, diisoheptyl γ-isopropylhexadecanedioate, dioctyl γ-isopropylhexadecanedioate, diisooctyl γ-isopropylhexadecanedioate, bis(2-ethylhexyl)γ-isopropylhexadecanedioate, dimethyl α,β-dimethylhexadecanedioate, diethyl α,β-dimethylhexadecanedioate, dipropyl α,β-dimethylhexadecanedioate, diisopropyl α,β-dimethylhexadecanedioate, dibutyl α,β-dimethylhexadecanedioate, diisobutyl α,β-dimethylhexadecanedioate, dipentyl α,β-dimethylhexadecanedioate, diisopentyl α,β-dimethylhexadecanedioate, dihexyl α,β-dimethylhexadecanedioate, diisohexyl α,β-dimethylhexadecanedioate, diheptyl α,β-dimethylhexadecanedioate, diisoheptyl α,β-dimethylhexadecanedioate, dioctyl α,β-dimethylhexadecanedioate, diisooctyl α,β-dimethylhexadecanedioate, bis(2-ethylhexyl)α,β-dimethylhexadecanedioate, dimethyl α,β-diethylhexadecanedioate, diethyl α,β-diethylhexadecanedioate, dipropyl α,β-diethylhexadecanedioate, diisopropyl α,β-diethylhexadecanedioate, dibutyl α,β-diethylhexadecanedioate, diisobutyl α,β-diethylhexadecanedioate, dipentyl α,β-diethylhexadecanedioate, diisopentyl α,β-diethylhexadecanedioate, dihexyl α,β-diethylhexadecanedioate, diisohexyl α,β-diethylhexadecanedioate, diheptyl α,β-diethylhexadecanedioate, diisoheptyl α,β-diethylhexadecanedioate, dioctyl α,β-diethylhexadecanedioate, diisooctyl α,β-diethylhexadecanedioate, bis(2-ethylhexyl)α,β-diethylhexadecanedioate, dimethyl α,β-diisopropylhexadecanedioate, diethyl α,β-diisopropylhexadecanedioate, dipropyl α,β-diisopropylhexadecanedioate, diisopropyl α,β-diisopropylhexadecanedioate, dibutyl α,β-diisopropylhexadecanedioate, diisobutyl α,β-diisopropylhexadecanedioate, dipentyl α,β-diisopropylhexadecanedioate, diisopentyl α,β-diisopropylhexadecanedioate, dihexyl α,β-diisopropylhexadecanedioate, diisohexyl α,β-diisopropylhexadecanedioate, diheptyl α,β-diisopropylhexadecanedioate, diisoheptyl α,β-diisopropylhexadecanedioate, dioctyl α,β-diisopropylhexadecanedioate, diisooctyl α,β-diisopropylhexadecanedioate, bis(2-ethylhexyl)α,β-diisopropylhexadecanedioate, hexadecanedioyl dichloride, α-methylhexadecanedioyl dichloride, α-ethylhexadecanedioyl dichloride, α-isopropylhexadecanedioyl dichloride, β-methylhexadecanedioyl dichloride, β-ethylhexadecanedioyl dichloride, β-isopropylhexadecanedioyl dichloride, γ-methylhexadecanedioyl dichloride, γ-ethylhexadecanedioyl dichloride, γ-isopropylhexadecanedioyl dichloride, α,β-dimethylhexadecanedioyl dichloride, α,β-diethylhexadecanedioyl dichloride, and α,β-diisopropylhexadecanedioyl dichloride.

Examples of the internal electron donor represented by formula (I), wherein n is 15, are as follows: dimethyl heptadecanedioate, diethyl heptadecanedioate, dipropyl heptadecanedioate, diisopropyl heptadecanedioate, dibutyl heptadecanedioate, diisobutyl heptadecanedioate, dipentyl heptadecanedioate, diisopentyl heptadecanedioate, dihexyl heptadecanedioate, diisohexyl heptadecanedioate, diheptyl heptadecanedioate, diisoheptyl heptadecanedioate, dioctyl heptadecanedioate, diisooctyl heptadecanedioate, bis(2-ethylhexyl)heptadecanedioate, dimethyl α-methylheptadecanedioate, diethyl α-methylheptadecanedioate, dipropyl α-methylheptadecanedioate, diisopropyl α-methylheptadecanedioate, dibutyl α-methylheptadecanedioate, diisobutyl α-methylheptadecanedioate, dipentyl α-methylheptadecanedioate, diisopentyl α-methylheptadecanedioate, dihexyl α-methylheptadecanedioate, diisohexyl α-methylheptadecanedioate, diheptyl α-methylheptadecanedioate, diisoheptyl α-methylheptadecanedioate, dioctyl α-methylheptadecanedioate, diisooctyl α-methylheptadecanedioate, bis(2-ethylhexyl)α-methylheptadecanedioate, dimethyl α-ethylheptadecanedioate, diethyl α-ethylheptadecanedioate, dipropyl α-ethylheptadecanedioate, diisopropyl α-ethylheptadecanedioate, dibutyl α-ethylheptadecanedioate, diisobutyl α-ethylheptadecanedioate, dipentyl α-ethylheptadecanedioate, diisopentyl α-ethylheptadecanedioate, dihexyl α-ethylheptadecanedioate, diisohexyl α-ethylheptadecanedioate, diheptyl α-ethylheptadecanedioate, diisoheptyl α-ethylheptadecanedioate, dioctyl α-ethylheptadecanedioate, diisooctyl α-ethylheptadecanedioate, bis(2-ethylhexyl) α-ethylheptadecanedioate, dimethyl α-isopropylheptadecanedioate, diethyl α-isopropylheptadecanedioate, dipropyl α-isopropylheptadecanedioate, diisopropyl α-isopropylheptadecanedioate, dibutyl α-isopropylheptadecanedioate, diisobutyl α-isopropylheptadecanedioate, dipentyl α-isopropylheptadecanedioate, diisopentyl α-isopropylheptadecanedioate, dihexyl α-isopropylheptadecanedioate, diisohexyl α-isopropylheptadecanedioate, diheptyl α-isopropylheptadecanedioate, diisoheptyl α-isopropylheptadecanedioate, dioctyl α-isopropylheptadecanedioate, diisooctyl α-isopropylheptadecanedioate, bis(2-ethylhexyl) α-isopropylheptadecanedioate, didimethyl β-methylheptadecanedioate, diethyl β-methylheptadecanedioate, dipropyl β-methylheptadecanedioate, diisopropyl β-methylheptadecanedioate, dibutyl β-methylheptadecanedioate, diisobutyl β-methylheptadecanedioate, dipentyl β-methylheptadecanedioate, diisopentyl β-methylheptadecanedioate, dihexyl β-methylheptadecanedioate, diisohexyl β-methylheptadecanedioate, diheptyl β-methylheptadecanedioate, diisoheptyl β-methylheptadecanedioate, dioctyl β-methylheptadecanedioate, diisooctyl β-methylheptadecanedioate, bis(2-ethylhexyl)β-methylheptadecanedioate, dimethyl β-ethylheptadecanedioate, diethyl β-ethylheptadecanedioate, dipropyl β-ethylheptadecanedioate, diisopropyl β-ethylheptadecanedioate, dibutyl β-ethylheptadecanedioate, diisobutyl β-ethylheptadecanedioate, dipentyl β-ethylheptadecanedioate, diisopentyl β-ethylheptadecanedioate, dihexyl β-ethylheptadecanedioate, diisohexyl β-ethylheptadecanedioate, diheptyl β-ethylheptadecanedioate, diisoheptyl β-ethylheptadecanedioate, dioctyl β-ethylheptadecanedioate, diisooctyl β-ethylheptadecanedioate, bis(2-ethylhexyl)β-ethylheptadecanedioate, dimethyl β-isopropylheptadecanedioate, diethyl β-isopropylheptadecanedioate, dipropyl β-isopropylheptadecanedioate, diisopropyl β-isopropylheptadecanedioate, dibutyl β-isopropylheptadecanedioate, diisobutyl β-isopropylheptadecanedioate, dipentyl β-isopropylheptadecanedioate, diisopentyl β-isopropylheptadecanedioate, dihexyl β-isopropylheptadecanedioate, diisohexyl β-isopropylheptadecanedioate, diheptyl β-isopropylheptadecanedioate, diisoheptyl β-isopropylheptadecanedioate, dioctyl β-isopropylheptadecanedioate, diisooctyl β-isopropylheptadecanedioate, bis(2-ethylhexyl)β-isopropylheptadecanedioate, dimethyl γ-methylheptadecanedioate, diethyl γ-methylpeptadecanedioate, dipropyl γ-methylheptadecanedioate, diisopropyl γ-methylheptadecanedioate, dibutyl γ-methylheptadecanedioate, diisobutyl γ-methylheptadecanedioate, dipentyl γ-methylheptadecanedioate, diisopentyl γ-methylheptadecanedioate, dihexyl γ-methylheptadecanedioate, diisohexyl γ-methylheptadecanedioate, diheptyl γ-methylheptadecanedioate, diisoheptyl γ-methylheptadecanedioate, dioctyl γ-methylheptadecanedioate, diisooctyl γ-methylheptadecanedioate, bis(2-ethylhexyl)γ-methylheptadecanedioate, dimethyl γ-ethylheptadecanedioate, diethyl γ-ethylheptadecanedioate, dipropyl γ-ethylheptadecanedioate, diisopropyl γ-ethylheptadecanedioate, dibutyl γ-ethylheptadecanedioate, diisobutyl γ-ethylheptadecanedioate, dipentyl γ-ethylheptadecanedioate, diisopentyl γ-ethylheptadecanedioate, dihexyl γ-ethylheptadecanedioate, diisohexyl γ-ethylheptadecanedioate, diheptyl γ-ethylheptadecanedioate, diisoheptyl γ-ethylheptadecanedioate, dioctyl γ-ethylheptadecanedioate, diisooctyl γ-ethylheptadecanedioate, bis(2-ethylhexyl)γ-ethylheptadecanedioate, dimethyl γ-isopropylheptadecanedioate, diethyl γ-isoproplyheptadecanedioate, dipropyl γ-isopropylheptadecanedioate, diisopropyl γ-isopropylheptadecanedioate, dibutyl γ-isopropylheptadecanedioate, diisobutyl γ-isopropylheptadecanedioate, dipentyl γ-isopropylheptadecanedioate, diisopentyl γ-isopropylheptadecanedioate, dihexyl γ-isopropylheptadecanedioate, diisohexyl γ-isopropylheptadecanedioate, diheptyl γ-isopropylheptadecanedioate, diisoheptyl γ-isopropylheptadecanedioate, dioctyl γ-isopropylheptadecanedioate, diisooctyl γ-isopropylheptadecanedioate, bis(2-ethylhexyl)γ-isopropylheptadecanedioate, dimethyl α,β-dimethylheptadecanedioate, diethyl α,β-dimethylheptadecanedioate, dipropyl α,β-dimethylheptadecanedioate, diisopropyl α,β-dimethylheptadecanedioate, dibutyl α,β-dimethylheptadecanedioate, diisobutyl α,β-dimethylheptadecanedioate, dipentyl α,β-dimethylheptadecanedioate, diisopentyl α,β-dimethylheptadecanedioate, dihexyl α,β-dimethylheptadecanedioate, diisohexyl α,β-dimethylheptadecanedioate, diheptyl α,β-dimethylheptadecanedioate, diisoheptyl α,β-dimethylheptadecanedioate, dioctyl α,β-dimethylheptadecanedioate, diisooctyl α,β-dimethylheptadecanedioate, bis(2-ethylhexyl)α,β-dimethylheptadecanedioate, dimethyl α,β-diethylheptadecanedioate, diethyl α,β-diethylheptadecanedioate, dipropyl α,β-diethylheptadecanedioate, diisopropyl α,β-diethylheptadecanedioate, dibutyl α,β-diethylheptadecanedioate, diisobutyl α,β-diethylheptadecanedioate, dipentyl α,β-diethylheptadecanedioate, diisopentyl α,β-diethylheptadecanedioate, dihexyl α,β-diethylheptadecanedioate, diisohexyl α,β-diethylheptadecanedioate, diheptyl α,β-diethylheptadecanedioate, diisoheptyl α,β-diethylheptadecanedioate, dioctyl α,β-diethylheptadecanedioate, diisooctyl α,β-diethylheptadecanedioate, bis(2-ethylhexyl)α,β-diethylheptadecanedioate, dimethyl α,β-diisopropylheptadecanedioate, diethyl α,β-diisopropylheptadecanedioate, dipropyl α,β-diisopropylheptadecanedioate, diisopropyl α,β-diisopropylheptadecanedioate, dibutyl α,β-diisopropylheptadecanedioate, diisobutyl α,β-diisopropylheptadecanedioate, dipentyl α,β-diisopropylheptadecanedioate, diisopentyl α,β-diisopropylheptadecanedioate, dihexyl α,β-diisopropylheptadecanedioate, diisohexyl α,β-diisopropylheptadecanedioate, diheptyl α,β-diisopropylheptadecanedioate, diisoheptyl α,β-diisopropylheptadecanedioate, dioctyl α,β-diisopropylheptadecanedioate, diisooctyl α,β-diisopropylheptadecanedioate, bis(2-ethylhexyl)α,β-diisopropylheptadecanedioate, heptadecanedioyl dichloride, α-methylheptadecanedioyl dichloride, α-ethylheptadecanedioyl dichloride, α-isopropylheptadecanedioyl dichloride, β-methylheptadecanedioyl dichloride, β-ethylheptadecanedioyl dichloride, β-isopropylheptadecanedioyl dichloride, γ-methylheptadecanedioyl dichloride, γ-ethylheptadecanedioyl dichloride, γ-isopropylheptadecanedioyl dichloride, α,β-dimethylheptadecanedioyl dichloride, α,β-diethylheptadecanedioyl dichloride, and α,β-diisopropylheptadecanedioyl dichloride.

Examples of the internal electron donor represented by formula (I), wherein n is 16, are as follows: dimethyl octadecanedioate, diethyl octadecanedioate, dipropyl octadecanedioate, diisopropyl octadecanedioate, dibutyl octadecanedioate, diisobutyl octadecanedioate, dipentyl octadecanedioate, diisopentyl octadecanedioate, dihexyl octadecanedioate, diisohexyl octadecanedioate, diheptyl octadecanedioate, diisoheptyl octadecanedioate, dioctyl octadecanedioate, diisooctyl octadecanedioate, bis(2-ethylhexyl)octadecanedioate, dimethyl α-methyloctadecanedioate, diethyl α-methyloctadecanedioate, dipropyl α-methyloctadecanedioate, diisopropyl α-methyloctadecanedioate, dibutyl α-methyloctadecanedioate, diisobutyl α-methyloctadecanedioate, dipentyl α-methyloctadecanedioate, diisopentyl α-methyloctadecanedioate, dihexyl α-methyloctadecanedioate, diisohexyl α-methyloctadecanedioate, diheptyl α-methyloctadecanedioate, diisoheptyl α-methyloctadecanedioate, dioctyl α-methyloctadecanedioate, diisooctyl α-methyloctadecanedioate, bis(2-ethylhexyl)α-methyloctadecanedioate, dimethyl α-ethyloctadecanedioate, diethyl α-ethyloctadecanedioate, dipropyl α-ethyloctadecanedioate, diisopropyl α-ethyloctadecanedioate, dibutyl α-ethyloctadecanedioate, diisobutyl α-ethyloctadecanedioate, dipentyl α-ethyloctadecanedioate, diisopentyl α-ethyloctadecanedioate, dihexyl α-ethyloctadecanedioate, diisohexyl α-ethyloctadecanedioate, diheptyl α-ethyloctadecanedioate, diisoheptyl α-ethyloctadecanedioate, dioctyl α-ethyloctadecanedioate, diisooctyl α-ethyloctadecanedioate, bis(2-ethylhexyl)α-ethyloctadecanedioate, dimethyl α-isopropyloctadecanedioate, diethyl α-isopropyloctadecanedioate, dipropyl α-isopropyloctadecanedioate, diisopropyl α-isopropyloctadecanedioate, dibutyl α-isopropyloctadecanedioate, diisobutyl α-isopropyloctadecanedioate, dipentyl α-isopropyloctadecanedioate, diisopentyl α-isopropyloctadecanedioate, dihexyl α-isopropyloctadecanedioate, diisohexyl α-isopropyloctadecanedioate, diheptyl α-isopropyloctadecanedioate, diisoheptyl α-isopropyloctadecanedioate, dioctyl α-isopropyloctadecanedioate, diisooctyl α-isopropyloctadecanedioate, bis(2-ethylhexyl)α-isopropyloctadecanedioate, didimethyl β-methyloctadecanedioate, diethyl β-methyloctadecanedioate, dipropyl β-methyloctadecanedioate, diisopropyl β-methyloctadecanedioate, dibutyl β-methyloctadecanedioate, diisobutyl β-methyloctadecanedioate, dipentyl β-methyloctadecanedioate, diisopentyl β-methyloctadecanedioate, dihexyl β-methyloctadecanedioate, diisohexyl β-methyloctadecanedioate, diheptyl β-methyloctadecanedioate, diisoheptyl β-methyloctadecanedioate, dioctyl β-methyloctadecanedioate, diisooctyl β-methyloctadecanedioate, bis(2-ethylhexyl)β-methyloctadecanedioate, dimethyl β-ethyloctadecanedioate, diethyl β-ethyloctadecanedioate, dipropyl β-ethyloctadecanedioate, diisopropyl β-ethyloctadecanedioate, dibutyl β-ethyloctadecanedioate, diisobutyl β-ethyloctadecanedioate, dipentyl β-ethyloctadecanedioate, diisopentyl β-ethyloctadecanedioate, dihexyl β-ethyloctadecanedioate, diisohexyl β-ethyloctadecanedioate, diheptyl β-ethyloctadecanedioate, diisoheptyl β-ethyloctadecanedioate, dioctyl β-ethyloctadecanedioate, diisooctyl β-ethyloctadecanedioate, bis(2-ethylhexyl)β-ethyloctadecanedioate, dimethyl β-isopropyloctadecanedioate, dipropyl β-isopropyloctadecanedioate, diisopropyl β-isopropyloctadecanedioate, dibutyl β-isopropyloctadecanedioate, diisobutyl β-isopropyloctadecanedioate, dipentyl β-isopropyloctadecanedioate, diisopentyl β-isopropyloctadecanedioate, dihexyl β-isopropyloctadecanedioate, diisohexyl β-isopropyloctadecanedioate, diheptyl β-isopropyloctadecanedioate, diisoheptyl β-isopropyloctadecanedioate, dioctyl β-isopropyloctadecanedioate, diisooctyl β-isopropyloctadecanedioate, bis(2-ethylhexyl)β-isopropyloctadecanedioate, dimethyl γ-methyloctadecanedioate, diethyl γ-methyloctadecanedioate, dipropyl γ-methyloctadecanedioate, diisopropyl γ-methyloctadecanedioate, dibutyl γ-methyloctadecanedioate, diisobutyl γ-methyloctadecanedioate, dipentyl γ-methyloctadecanedioate, diisopentyl γ-methyloctadecanedioate, dihexyl γ-methyloctadecanedioate, diisohexyl γ-methyloctadecanedioate, diheptyl γ-methyloctadecanedioate, diisoheptyl γ-methyloctadecanedioate, dioctyl γ-methyloctadecanedioate, diisooctyl γ-methyloctadecanedioate, bis(2-ethylhexyl) γ-methyloctadecanedioate, dimethyl γ-ethyloctadecanedioate, diethyl γ-ethyloctadecanedioate, dipropyl γ-ethyloctadecanedioate, diisopropyl γ-ethyloctadecanedioate, dibutyl γ-ethyloctadecanedioate, diisobutyl γ-ethyloctadecanedioate, dipentyl γ-ethyloctadecanedioate, diisopentyl γ-ethyloctadecanedioate, dihexyl γ-ethyloctadecanedioate, diisohexyl γ-ethyloctadecanedioate, diheptyl γ-ethyloctadecanedioate, diisoheptyl γ-ethyloctadecanedioate, dioctyl γ-ethyloctadecanedioate, diisooctyl γ-ethyloctadecanedioate, bis(2-ethylhexyl)γ-ethyloctadecanedioate, dimethyl γ-isopropyloctadecanedioate, diethyl γ-isopropyloctadecanedioate, dipropyl γ-isopropyloctadecanedioate, diisopropyl γ-isopropyloctadecanedioate, dibutyl γ-isopropyloctadecanedioate, diisobutyl γisopropyloctadecanedioate, dipentyl γ-isopropyloctadecanedioate, diisopentyl γ-isopropyloctadecanedioate, dihexyl γ-isopropyloctadecanedioate, diisohexyl γ-isopropyloctadecanedioate, diheptyl γ-isopropyloctadecanedioate, diisoheptyl γ-isopropyloctadecanedioate, dioctyl γ-isopropyloctadecanedioate, diisooctyl γ-isopropyloctadecanedioate, bis(2-ethylhexyl)γ-isopropyloctadecanedioate, dimethyl α,β-dimethyloctadecanedioate, diethyl α,β-dimethyloctadecanedioate, dipropyl α,β-dimethyloctadecanedioate, diisopropyl α,β-dimethyloctadecanedioate, dibutyl α,β-dimethyloctadecanedioate, diisobutyl α,β-dimethyloctadecanedioate, dipentyl α,β-dimethyloctadecanedioate, diisopentyl α,β-dimethyloctadecanedioate, dihexyl α,β-dimethyloctadecanedioate, diisohexyl α,β-dimethyloctadecanedioate, diheptyl α,β-dimethyloctadecanedioate, diisoheptyl α,β-dimethyloctadecanedioate, dioctyl α,β-dimethyloctadecanedioate, diisooctyl α,β-dimethyloctadecanedioate, bis(2-ethylhexyl)α,β-dimethyloctadecanedioate, dimethyl α,β-diethyloctadecanedioate, diethyl α,βdiethyloctadecanedioate, dipropyl α,β-diethyloctadecanedioate, diisopropyl α,β-diethyloctadecanedioate, dibutyl α,β-diethyloctadecanedioate, diisobutyl α,β-diethyloctadecanedioate, dipentyl α,β-diethyloctadecanedioate, diisopentyl α,β-diethyloctadecanedioate, dihexyl α,β-diethyloctadecanedioate, diisohexyl α,β-diethyloctadecanedioate, diheptyl α,β-diethyloctadecanedioate, diisoheptyl α,β-diethyloctadecanedioate, dioctyl α,β-diethyloctadecanedioate, diisooctyl α,β-diethyloctadecanedioate, bis(2-ethylhexyl)α,β-diethyloctadecanedioate, dimethyl α, γ-diisopropyloctadecanedioate, diethyl α, γ-diisopropyloctadecanedioate, dipropyl α,β-diisopropyloctadecanedioate, diisopropyl α,β-diisopropyloctadecanedioate, dibutyl α,β- diisopropyloctadecanedioate, diisobutyl α,β-diisopropyloctadecanedioate, dipentyl α,β-diisopropyloctadecanedioate, diisopentyl α,β-diisopropyloctadecanedioate, dihexyl α,β-diisopropyloctadecanedioate, diisohexyl α,β-diisopropyloctadecanedioate, diheptyl α,β-diisopropyloctadecanedioate, diisoheptyl α,β-diisopropyloctadecanedioate, dioctyl α,β-diisopropyloctadecanedioate, diisooctyl α,β-diisopropyloctadecanedioate, bis(2-ethylhexyl)α,β-diisopropyloctadecanedioate, octadecanedioyl dichloride, α-methyloctadecanedioyl dichloride, α-ethyloctadecanedioyl dichloride, α-isopropyloctadecanedioyl dichloride, β-methyloctadecanedioyl dichloride, β-ethyloctadecanedioyl dichloride, β-isopropyloctadecanedioyl dichloride, γ-methyloctadecanedioyl dichloride, γ-ethyloctadecanedioyl dichloride, γ-isopropyloctadecanedioyl dichloride, α,β-dimethyloctadecanedioyl dichloride, α,β-diethyloctadecanedioyl dichloride, and α,β-diisopropyloctadecanedioyl dichloride.

Examples of the internal electron donor represented by formula (I), wherein n is 17, are as follows: dimethyl nonadecanedioate, diethyl nonadecanedioate, dipropyl nonadecanedioate, diisopropyl nonadecanedioate, dibutyl nonadecanedioate, diisobutyl nonadecanedioate, dipentyl nonadecanedioate, diisopentyl nonadecanedioate, dihexyl nonadecanedioate, diisohexyl nonadecanedioate, diheptyl nonadecanedioate, diisoheptyl nonadecanedioate, dioctyl nonadecanedioate, diisooctyl nonadecanedioate, bis(2-ethylhexyl) nonadecanedioate, dimethyl α-methylnonadecanedioate, diethyl α-methylnonadecanedioate, dipropyl α-methylnonadecanedioate, diisopropyl α-methylnonadecanedioate, dibutyl α-methylnonadecanedioate, diisobutyl α-methylnonadecanedioate, dipentyl α-methylnonadecanedioate, diisopentyl α-methylnonadecanedioate, dihexyl α-methylnonadecanedioate, diisohexyl α-methylnonadecanedioate, diheptyl α-methylnonadecanedioate, diisoheptyl α-methylnonadecanedioate, dioctyl α-methylnonadecanedioate, diisooctyl α-methylnonadecanedioate, bis(2-ethylhexyl)α-methylnonadecanedioate, dimethyl α-ethylnonadecanedioate, diethyl α-ethylnonadecanedioate, dipropyl α-ethylnonadecanedioate, diisopropyl α-ethylnonadecanedioate, dibutyl α-ethylnonadecanedioate, diisobutyl α-ethylnonadecanedioate, dipentyl α-ethylnonadecanedioate, diisopentyl α-ethylnonadecanedioate, dihexyl α-ethylnonadecanedioate, diisohexyl α-ethylnonadecanedioate, diheptyl α-ethylnonadecanedioate, diisoheptyl α-ethylnonadecanedioate, dioctyl α-ethylnonadecanedioate, diisooctyl α-ethylnonadecanedioate, bis(2-ethylhexyl)α-ethylnonadecanedioate, dimethyl α-isopropylnonadecanedioate, diethyl α-isopropylnonadecanedioate, dipropyl α-isopropylnonadecanedioate, diisopropyl α-isopropylnonadecanedioate, dibutyl α-isopropylnonadecanedioate, diisobutyl α-isopropylnonadecanedioate, dipentyl α-isopropylnonadecanedioate, diisopentyl α-isopropylnonadecanedioate, dihexyl αisopropylnonadecanedioate, diisohexyl α-isopropylnonadecanedioate, diheptyl α-isopropylnonadecanedioate, diisoheptyl α-isopropylnonadecanedioate, dioctyl α-isopropylnonadecanedioate, diisooctyl α-isopropylnonadecanedioate, bis(2-ethylhexyl)α-isopropylnonadecanedioate, didimethyl β-methylnonadecanedioate, diethyl β-methylnonadecanedioate, dipropyl β-methylnonadecanedioate, diisopropyl β-methylnonadecanedioate, dibutyl β-methylnonadecanedioate, diisobutyl β-methylnonadecanedioate, dipentyl β-methylnonadecanedioate, diisopentyl β-methylnonadecanedioate, dihexyl β-methylnonadecanedioate, diisohexyl β-methylnonadecanedioate, diheptyl β-methylnonadecanedioate, diisoheptyl β-methylnonadecanedioate, dioctyl β-methylnonadecanedioate, diisooctyl β-methylnonadecanedioate, bis(2-ethylhexyl)β-methylnonadecanedioate, dimethyl β-ethylnonadecanedioate, diethyl β-ethylnonadecanedioate, dipropyl β-ethylnonadecanedioate, diisopropyl β-ethylnonadecanedioate, dibutyl β-ethylnonadecanedioate, diisobutyl β-ethylnonadecanedioate, dipentyl β-ethylnonadecanedioate, diisopentyl β-ethylnonadecanedioate, dihexyl β-ethylnonadecanedioate, diisohexyl β-ethylnonadecanedioate, diheptyl β-ethylnonadecanedioate, diisoheptyl β-ethylnonadecanedioate, dioctyl β-ethylnonadecanedioate, diisooctyl β-ethylnonadecanedioate, bis(2-ethylhexyl)β-ethylnonadecanedioate, dimethyl β-isopropylnonadecanedioate, diethyl β-isopropylnonadecanedioate, dipropyl β-isopropylnonadecanedioate, diisopropyl β-isopropylnonadecanedioate, dibutyl β-isopropylnonadecanedioate, diisobutyl β-isopropylnonadecanedioate, dipentyl β-isopropylnonadecanedioate, diisopentyl β-isopropylnonadecanedioate, dihexyl β-isopropylnonadecanedioate, diisohexyl β-isopropylnonadecanedioate, diheptyl β-isopropylnonadecanedioate, diisoheptyl β-isopropylnonadecanedioate, dioctyl β-isopropylnonadecanedioate, diisooctyl β-isopropylnonadecanedioate, bis(2-ethylhexyl)β-isopropylnonadecanedioate, dimethyl γ-methylnonadecanedioate, diethyl γ-methylnonadecanedioate, dipropyl γ-methylnonadecanedioate, diisopropyl γ-methylnonadecanedioate, dibutyl γ-methylnonadecanedioate, diisobutyl γ-methylnonadecanedioate, dipentyl γ-methylnonadecanedioate, diisopentyl γ-methylnonadecanedioate, dihexyl γ-methylnonadecanedioate, diisohexyl γ-methylnonadecanedioate, diheptyl γ-methylnonadecanedioate, diisoheptyl γ-methylnonadecanedioate, dioctyl γ-methylnonadecanedioate, diisooctyl γ-methylnonadecanedioate, bis(2-ethylhexyl)γ-methylnonadecanedioate, dimethyl γ-ethylnonadecanedioate, diethyl γ-ethylnonadecanedioate, dipropyl γ-ethylnonadecanedioate, diisopropyl γ-ethylnonadecanedioate, dibutyl γ-ethylnonadecanedioate, diisobutyl γ-ethylnonadecanedioate, dipentyl γ-ethylnonadecanedioate, diisopentyl γ-ethylnonadecanedioate, dihexyl γ-ethylnonadecanedioate, diisohexyl γ-ethylnonadecanedioate, diheptyl γ-ethylnonadecanedioate, diisoheptyl γ-ethylnonadecanedioate, dioctyl γ-ethylnonadecanedioate, diisooctyl γ-ethylnonadecanedioate, bis(2-ethylhexyl)γ-ethylnonadecanedioate, dimethyl γ-isopropylnonadecanedioate, diethyl γ-isopropylnonadecanedioate, dipropyl γ-isopropylnonadecanedioate, diisopropyl γ-isopropylnonadecanedioate, dibutyl γ-isopropylnonadecanedioate, diisobutyl γ-isopropylnonadecanedioate, dipentyl γ-isopropylnonadecanedioate, diisopentyl γ-isopropylnonadecanedioate, dihexyl γ-isopropylnonadecanedibate, diisohexyl γ-isopropylnonadecanedioate, diheptyl γ-isopropylnonadecanedioate, diisoheptyl γ-isopropylnonadecanedioate, dioctyl γ-isopropylnonadecanedioate, diisooctyl γ-isopropylnonadecanedioate, bis(2-ethylhexyl)γ-isopropylnonadecanedioate, dimethyl α,β-dimethylnonadecanedioate, diethyl α,β-dimethylnonadecanedioate, dipropyl α,β-dimethylnonadecanedioate, diisopropyl α,β-dimethylnonadecanedioate, dibutyl α,β-dimethylnonadecanedioate, diisobutyl α,β-dimethylnonadecanedioate, dipentyl α,β-dimethylnonadecanedioate, diisopentyl α,β-dimethylnonadecanedioate, dihexyl α,β-dimethylnonadecanedioate, diisohexyl α,β-dimethylnonadecanedioate, diheptyl α,β-dimethylnonadecanedioate, diisoheptyl α,β-dimethylnonadecanedioate, dioctyl α,β-dimethylnonadecanedioate, diisooctyl α,β-dimethylnonadecanedioate, bis(2-ethylhexyl)α,β-dimethylnonadecanedioate, dimethyl α,β-diethylnonadecanedioate, diethyl α,β-diethylnonadecanedioate, dipropyl α,β- diethylnonadecanedioate, diisopropyl α,β-diethylnonadecanedioate, dibutyl α,β-diethylnonadecanedioate, diisobutyl α,β-diethylnonadecanedioate, dipentyl α,β-diethylnonadecanedioate, diisopentyl α,β-diethylnonadecanedioate, dihexyl α,β-diethylnonadecanedioate, diisohexyl α,β-diethylnonadecanedioate, diheptyl α,β-diethylnonadecanedioate, diisoheptyl α,β-diethylnonadecanedioate, dioctyl α,β-diethylnonadecanedioate, diisooctyl α,β-diethylnonadecanedioate, bis(2-ethylhexyl)α,β-diethylnonadecanedioate, dimethyl α,β-diisopropylnonadecanedioate, diethyl α,β-diisopropylnonadecanedioate, dipropyl α,β-diisopropylnonadecanedioate, diisopropyl α,β-diisopropylnonadecanedioate, dibutyl α,β-diisopropylnonadecanedioate, diisobutyl α,β-diisopropylnonadecanedioate, dipentyl α,β-diisopropylnonadecanedioate, diisopentyl α,β-diisopropylnonadecanedioate, dihexyl α,β-diisopropylnonadecanedioate, diisohexyl α,β-diisopropylnonadecanedioate, diheptyl α,β-diisopropylnonadecanedioate, diisoheptyl α,β-diisopropylnonadecanedioate, dioctyl α,β-diisopropylnonadecanedioate, diisooctyl α,β-diisopropylnonadecanedioate, bis(2-ethylhexyl)α,β-diisopropylnonadecanedioate, nonadecanedioyl dichloride, α-methylnonadecanedioyl dichloride, α-ethylnonadecanedioyl dichloride, α-isopropylnonadecanedioyl dichloride, β-methylnonadecanedioyl dichloride, β-ethylnonadecanedioyl dichloride, β-isopropylnonadecanedioyl dichloride, γ-methylnonadecanedioyl dichloride, γ-ethylnonadecanedioyl dichloride, γ-isopropylnonadecanedioyl dichloride, α,β-dimethylnonadecanedioyl dichloride, α,β-diethylnonadecanedioyl dichloride, and α,β-diisopropylnonadecanedioyl dichloride.

Examples of the internal electron donor represented by formula (I), wherein n is 18, are as follows: dimethyl eicosanedioate, diethyl eicosanedioate, dipropyl eicosanedioate, diisopropyl eicosanedioate, dibutyl eicosanedioate, diisobutyl eicosanedioate, dipentyl eicosanedioate, diisopentyl eicosanedioate, dihexyl eicosanedioate, diisohexyl eicosanedioate, diheptyl eicosanedioate, diisoheptyl eicosanedioate, dioctyl eicosanedioate, diisooctyl eicosanedioate, bis(2-ethylhexyl) eicosanedioate, dimethyl α-methyleicosanedioate, diethyl α-methyleicosanedioate, dipropyl α-methyleicosanedioate, diisopropyl α-methyleicosanedioate, dibutyl α-methyleicosanedioate, diisobutyl α-methyleicosanedioate, dipentyl α-methyleicosanedioate, diisopentyl α-methyleicosanedioate, dihexyl α-methyleicosanedioate, diisohexyl α-methyleicosanedioate, diheptyl α-methyleicosanedioate, diisoheptyl α-methyleicosanedioate, dioctyl α-methyleicosanedioate, diisooctyl α-methyleicosanedioate, bis(2-ethylhexyl)α-methyleicosanedioate, dimethyl α-ethyleicosanedioate, diethyl α-ethyleicosanedioate, dipropyl α-ethyleicosanedioate, diisopropyl α-ethyleicosanedioate, dibutyl α-ethyleicosanedioate, diisobutyl α-ethyleicosanedioate, dipentyl α-ethyleicosanedioate, diisopentyl α-ethyleicosanedioate, dihexyl α-ethyleicosanedioate, diisohexyl α-ethyleicosanedioate, diheptyl α-ethyleicosanedioate, diisoheptyl α-ethyleicosanedioate, dioctyl α-ethyleicosanedioate, diisooctyl α-ethyleicosanedioate, bis(2-ethylhexyl)α-ethyleicosanedioate, dimethyl α-isopropyleicosanedioate, diethyl α-isopropyleicosanedioate, dipropyl α-isopropyleicosanedioate, diisopropyl α-isopropyleicosanedioate, dibutyl α-isopropyleicosanedioate, diisobutyl α-isopropyleicosanedioate, dipentyl α-isopropyleicosanedioate, diisopentyl α-isopropyleicosanedioate, dihexyl α-isopropyleicosanedioate, diisohexyl α-isopropyleicosanedioate, diheptyl α-isopropyleicosanedioate, diisoheptyl α-isopropyleicosanedioate, dioctyl α-isopropyleicosanedioate, diisooctyl α-isopropyleicosanedioate, bis(2-ethylhexyl)α-isopropyleicosanedioate, didimethyl β-methyleicosanedioate, diethyl β-methyleicosanedioate, dipropyl β-methyleicosanedioate, diisopropyl β-methyleicosanedioate, dibutyl β-methyleicosanedioate, diisobutyl β-methyleicosanedioate, dipentyl β-methyleicosanedioate, diisopentyl β-methyleicosanedioate, dihexyl β-methyleicosanedioate, diisohexyl β-methyleicosanedioate, diheptyl β-methyleicosanedioate, diisoheptyl β-methyleicosanedioate, dioctyl β-methyleicosanedioate, diisooctyl β-methyleicosanedioate, bis(2-ethylhexyl)β-methyleicosanedioate, dimethyl β-ethyleicosanedioate, diethyl β-ethyleicosanedioate, dipropyl β-ethyleicosanedioate, diisopropyl β-ethyleicosanedioate, dibutyl β-ethyleicosanedioate, diisobutyl β-ethyleicosanedioate, dipentyl β-ethyleicosanedioate, diisopentyl β-ethyleicosanedioate, dihexyl β-ethyleicosanedioate, diisohexyl β-ethyleicosanedioate, diheptyl β-ethyleicosanedioate, diisoheptyl β-ethyleicosanedioate, dioctyl β-ethyleicosanedioate, diisooctyl β-ethyleicosanedioate, bis(2-ethylhexyl)β-ethyleicosanedioate, dimethyl β-isopropyleicosanedioate, diethyl β-isopropyleicosanedioate, dipropyl β-isopropyleicosanedioate, diisopropyl β-isopropyleicosanedioate, dibutyl β-isopropyleicosanedioate, diisobutyl β-isopropyleicosanedioate, dipentyl β-isopropyleicosanedioate, diisopentyl β-isopropyleicosanedioate, dihexyl βisopropyleicosanedioate, diisohexyl β-isopropyleicosanedioate, diheptyl β-isopropyleicosanedioate, diisoheptyl β-isopropyleicosanedioate, dioctyl β-isopropyleicosanedioate, diisooctyl β-isopropyleicosanedioate, bis(2-ethylhexyl)β-isopropyleicosanedioate, dimethyl γ-methyleicosanedioate, diethyl γ-methyleicosanedioate, dipropyl γ-methyleicosanedioate, diisopropyl γ-methyleicosanedioate, dibutyl γ-methyleicosanedioate, diisobutyl γ-methyleicosanedioate, dipentyl γ-methyleicosanedioate, diisopentyl γ-methyleicosanedioate, dihexyl γ-methyleicosanedioate, diisohexyl γ-methyleicosanedioate, diheptyl γ-methyleicosanedioate, diisoheptyl γ-methyleicosanedioate, dioctyl γ-methyleicosanedioate, diisooctyl γ-methyleicosanedioate, bis(2-ethylhexyl)γ-methyleicosanedioate, dimethyl γ-ethyleicosanedioate, diethyl γ-ethyleicosanedioate, dipropyl γ-ethyleicosanedioate, diisopropyl γ-ethyleicosanedioate, dibutyl γ-ethyleicosanedioate, diisobutyl γ-ethyleicosanedioate, dipentyl γ-ethyleicosanedioate, diisopentyl γ-ethyleicosanedioate, dihexyl γ-ethyleicosanedioate, diisohexyl γ-ethyleicosanedioate, diheptyl γ-ethyleicosanedioate, diisoheptyl γ-ethyleicosanedioate, dioctyl γ-ethyleicosanedioate, diisooctyl γ-ethyleicosanedioate, bis(2-ethylhexyl)γ-ethyleicosanedioate, dimethyl γ-isopropyleicosanedioate, diethyl γ-isopropyleicosanedioate, dipropyl γ-isopropyleicosanedioate, diisopropyl γ-isopropyleicosanedioate, dibutyl γ-isopropyleicosanedioate, diisobutyl γ-isopropyleicosanedioate, dipentyl γ-isopropyleicosanedioate, diisopentyl γ-isopropyleicosanedioate, dihexyl γ-isopropyleicosanedioate, diisohexyl γ-isopropyleicosanedioate, diheptyl γ-isopropyleicosanedioate, diisoheptyl γ-isopropyleicosanedioate, dioctyl γ-isopropyleicosanedioate, diisooctyl γ-isopropyleicosanedioate, bis(2-ethylhexyl)γ-isopropyleicosanedioate, dimethyl α,β-dimethyleicosanedioate, diethyl α,β-dimethyleicosanedioate, dipropyl α,β-dimethyleicosanedioate, diisopropyl α,β-dimethyleicosanedioate, dibutyl α,β-dimethyleicosanedioate, diisobutyl α,β-dimethyleicosanedioate, dipentyl α,β-dimethyleicosanedioate, diisopentyl α,β-dimethyleicosanedioate, dihexyl α,β-dimethyleicosanedioate, diisohexyl α,β-dimethyleicosanedioate, diheptyl α,β-dimethyleicosanedioate, diisoheptyl α,β-dimethyleicosanedioate, dioctyl α,β-dimethyleicosanedioate, diisooctyl α,β-dimethyleicosanedioate, bis(2-ethylhexyl)α,β-dimethyleicosanedioate, dimethyl α,β-diethyleicosanedioate, diethyl α,β-diethyleicosanedioate, dipropyl α,β-diethyleicosanedioate, diisopropyl α,β-diethyleicosanedioate, dibutyl α,β-diethyleicosanedioate, diisobutyl α,β-diethyleicosanedioate, dipentyl α,β-diethyleicosanedioate, diisopentyl α,β-diethyleicosanedioate, dihexyl α,β-diethyleicosanedioate, diisohexyl α,β-diethyleicosanedioate, diheptyl α,β-diethyleicosanedioate, diisoheptyl α,β-diethyleicosanedioate, dioctyl α,β-diethyleicosanedioate, diisooctyl α,β-diethyleicosanedioate, bis(2-ethylhexyl)α,β-diethyleicosanedioate, dimethyl α,β-diisopropyleicosanedioate, diethyl α,β-diisopropyleicosanedioate, dipropyl α,β-diisopropyleicosanedioate, diisopropyl α,β-diisopropyleicosanedioate, dibutyl α,β-diisopropyleicosanedioate, diisobutyl α,β-diisopropyleicosanedioate, dipentyl α,β-diisopropyleicosanedioate, diisopentyl α,β-diisopropyleicosanedioate, dihexyl α,β-diisopropyleicosanedioate, diisohexyl α,β-diisopropyleicosanedioate, diheptyl α,β-diisopropyleicosanedioate, diisoheptyl α,β-diisopropyleicosanedioate, dioctyl α,β-diisopropyleicosanedioate, diisooctyl α,β-diisopropyleicosanedioate, bis(2-ethylhexyl)α,β-diisopropyleicosanedioate, eicosanedioyl dichloride, α-methyleicosanedioyl dichloride, α-ethyleicosanedioyl dichloride, α-isopropyleicosanedioyl dichloride, β-methyleicosanedioyl dichloride, β-ethyleicosanedioyl dichloride, β-isopropyleicosanedioyl dichloride, γ-methyleicosanedioyl dichloride, γ-ethyleicosanedioyl dichloride, γ-isopropyleicosanedioyl dichloride, α,β-dimethyleicosanedioyl dichloride, α,β-diethyleicosanedioyl dichloride, and α,β-diisopropyleicosanedioyl dichloride.

The solid catalyst component of the present invention is not particularly restricted in its production process. Examples thereof are:

(1) a process comprising a step of contacting a titanium compound, a magnesium compound, and an internal electron donor represented by above formula (I) with one another; and (2) a process comprising a step of contacting a solid component containing a titanium atom and a magnesium atom with an internal electron donor represented by above formula (I). Production process (1) corresponds to above-mentioned "catalyst component production process-1" of the present invention, and production process (2) corresponds to above-mentioned "catalyst component production process-2" of the present invention.

The titanium compound in catalyst component production process-1 is not particularly limited, as long as the titanium compound contains a titanium atom. Examples of the titanium compound are a titanium tetrahalide such as titanium tetrachloride, titanium tetrabromide and titanium tetraiodide; a tetraalkoxytitanuim such as tetramethoxytitanium, tetraethoxytitanium, tetra-n-propoxytitanium, tetraisopropoxytitanium, tetra-n-butoxytitanium, tetraisobutoxytitanium, and tetracyclohexyloxytitanium; a tetraaryloxytitanium such as tetraphenoxytitanium; an alkoxytitanium trihalide such as methoxytitanium trichloride, ethoxytitanium trichloride, n-propoxytitanium trichloride, n-butoxytitanium trichloride, and ethoxytitanium tribromide; a dialkoxytitanium dihalide such as dimethoxytitanium dichloride, diethoxytitanium dichloride, diisopropoxytitanium dichloride, di-n-propoxytitanium dichloride, and diethoxytitanium dibromide; a trialkoxytitanium monohalide such as trimethoxytitanium chloride, triethoxytitanium chloride, triisopropoxytitanium chloride, tri-n-propoxytitanium chloride, tri-n-butoxytitanium chloride, and triethoxytitanium bromide; and a combination of two or more thereof. Among them, preferred is a titanium tetrahalide or an alkoxytitanium trihalide, more preferred is a titanium tetrahalide, and further preferred is titanium tetrachloride.

The magnesium compound in catalyst component production process-1 is not particularly limited, as long as the magnesium compound contains a magnesium atom. Examples of the magnesium compound are those represented by following formula (i) or (ii):

$$MgR^1_a X^1_{2-a} \quad (i)$$

$$Mg(OR^1)_a X^1_{2-a} \quad (ii)$$

wherein $R^1$ is a hydrocarbyl group having 1 to 20 carbon atoms, and plural $R^1$s are the same as, or different from each other; $X^1$ is a halogen atom, and plural $X^1$s are the same as, or different from each other; and a is an integer satisfying $0 \leq a \leq 2$.

Examples of $R^1$ are an alkyl group, an aralkyl group, an aryl group, and an alkenyl group. Those groups may carry a substituent such as a halogen atom, a hydrocarbyloxy group, a nitro group, a sulfonyl group, and a silyl group.

Examples of the alkyl group of $R^1$ are a linear alkyl group such as a methyl group, an ethyl group, a n-propyl group, a n-butyl group, a n-pentyl group, a n-hexyl group, a n-heptyl group, and a n-octyl group; a branched alkyl group such as an isopropyl group, an isobutyl group, a tert-butyl group, an isopenty group, a neopentyl group, and a 2-ethylhexyl group; and a cycloalkyl group such as a cyclopropyl group, a cyclobutyl group, a cyclopentyl group, a cyclohexyl group, a cycloheptyl group, and a cyclooctyl group. Among them, preferred is a linear or branched alkyl group having 1 to 20 carbon atoms.

Examples of the aralkyl group of $R^1$ are a benzyl group and a phenethyl group. Among them, preferred is an aralkyl group having 7 to 20 carbon atoms.

Examples of the aryl group of $R^1$ are a pheny group, a tolyl group, a xylyl group, a mesityl group, and a naphthy group. Among them, preferred is an aryl group having 6 to 20 carbon atoms.

Examples of the alkenyl group of $R^1$ are a linear alkenyl group such as a vinyl group, an allyl group, 3-butenyl group, and a 5-hexenyl group; a branched alkenyl group such as an isobutenyl group and a 4-methyl-3-pentenyl group; and a cycloalkenyl group such as 2-cyclohexenyl group and a 3-cyclohexenyl group. Among them, preferred is a linear or branched alkenyl group having 2 to 20 carbon atoms.

Examples of the halogen atom of $X^1$ are a chlorine atom, a bromine atom, an iodine atom, and a fluorine atom. Among them, preferred is a chlorine atom.

Examples of the magnesium compound represented by above formula (i) are a dialkylmagnesium such as dimethylmagnesium, diethylmagnesium, diisopropylmagnesium, dibutylmagnesium, dihexylmagnesium, dioctylmagnesium, ethylbutylmagnesium, and butyloctylmagnesium; a dialkoxymagnesium such as dimethoxymagnesium, diethoxymagnesium, dipropoxymagnesium, diisopropoxymagnesium, dibutoxymagnesium, and dioctoxymagnesium;

an alkylmagnesium halide such as methylmagnesium chloride, ethylmagnesium chloride, isopropylmagnesium chloride, isobutylmagnesium chloride, tert-butylmagnesium chloride, benzylmagnesium chloride, methylmagnesium bromide, ethylmagnesium bromide, isopropylmagnesium bromide, isobutylmagnesium bromide, tert-butylmagnesium bromide, hexylmagnesium bromide, benzylmagnesium bromide, methylmagnesium iodide, ethylmagnesium iodide, isopropylmagnesium iodide, isobutylmagnesium iodide, tert-butylmagnesium iodide, and benzylmagnesium iodide; an alkoxymagnesium halide such as methoxymagnesium chloride, ethoxymagnesium chloride, propoxymagnesium chloride, isopropoxymagnesium chloride, butoxymagnesium chloride, hexyloxymagnesium chloride, methoxymagnesium bromide, ethoxymagnesium bromide, isopropoxymagnesium bromide, butoxymagnesium bromide, hexyloxymagnesium bromide, methoxymagnesium iodide, ethoxymagnesium iodide, isopropoxymagnesium iodide, butoxymagnesium iodide, hexyloxymagnesium iodide; and a magnesium dihalide such as magnesium difluoride, magnesium dichloride, magnesium dibromide, and magnesium diiodide.

The magnesium compound is preferably a magnesium dihalide, a dialkoxymagnesium or an alkoxymagnesium halide. The magnesium dihalide is preferably magnesium dichloride, which is used in its solid state, or in its solution state dissolved in a solvent such as an alcohol (for example, methanol, ethanol and 2-ethylhexanol), and a hydrocarbyl solvent (for example, toluene and hexane), and which may be an adduct of a compound such as an alcohol, an ether and an ester. The above dialkoxymagnesium is preferably a dialkoxymagnesium having 1 to 20 carbon atoms, further preferably a dialkoxymagnesium having 1 to 10 carbon atoms, and particularly preferably dimethoxymagnesium, diethoxymagnesium, dipropoxymagnesium, diisopropoxymagnesium, or dibutoxymagnesium.

The above dialkoxymagnesium can be produced by a process, for example, comprising a step of contacting metal magnesium with alcohol such as methanol, ethanol, propanol, butanol, and octanol, in the presence of a catalyst. Examples of the catalyst are halogen such as iodine, chlorine and bromine; and a magnesium dihalide such as magnesium diiodide and magnesium dichloride. Among them, preferred is iodine.

The above alkoxymagnesium halide is preferably a hydrocarbyloxymagnesium chloride having 1 to 20 carbon atoms, further preferably a hydrocarbyloxymagnesium chloride having 1 to 10 carbon atoms, and particularly preferably methoxymagnesium chloride, ethoxymagnesium chloride, propoxymagnesium chloride, isopropoxymagnesium chloride, or butoxymagnesium chloride.

The magnesium compound may be supported on a support (or carrier). The support is not particularly limited in its kind, and examples thereof are a porous inorganic oxide such as $SiO_2$, $Al_2O_3$, MgO, $TiO_2$ and $ZrO_2$; and a porous organic polymer such as polystyrene, a styrene-divinylbenzene copolymer, a styrene-ethylene dimethacrylate copolymer, polymethyl acrylate, polyethyl acrylate, a methyl acrylate-divinylbenzene copolymer, polymethyl methacrylate, a methyl methacrylate-divinylbenzene copolymer, polyacrylonitrile, an acrylonitrile-divinylbenzene copolymer, polyvinyl chloride, polyethylene and polypropylene. Among them, preferred is a porous inorganic oxide, and particularly preferred is $SiO_2$.

In order to support effectively the magnesium compound on a support, the support has a pore volume of preferably 0.3 $cm^3/g$ or more, and more preferably 0.4 $cm^3/g$ or more, in a pore radius range of 20 to 200 nm, a proportion of which pore volume is preferably 35% or more, and more preferably 40% or more, provided that a proportion of its pore volume in a pore radius range of 3.5 to 7,500 nm is 100%.

The titanium compound in catalyst component production process-1 is used in an amount of usually 0.1 to 1,000 mmol, preferably 0.3 to 500 mmol, and particularly preferably 0.5 to 300 mmol, per one mol of a magnesium atom contained in the magnesium compound used. The titanium compound is used at one time, or in two or more batches.

The internal electron donor in catalyst component production process-1 is used in an amount of usually 0.1 to 1,000 mmol, preferably 0.3 to 500 mmol, and particularly preferably 0.5 to 300 mmol, per one mol of a magnesium atom contained in the magnesium compound used. The internal electron donor is used at one time, or in two or more batches.

Catalyst component production process-1 is not particularly limited in its contact method. Examples thereof are those known in the art such as (1-1) a slurry method, and (1-2) a mechanically pulverizing method using a ball mill.

The above slurry method comprises a step of contacting the titanium compound, the magnesium compound and the internal electron donor with one another in a slurry state, at usually 30 to 150° C., preferably 45 to 135° C., and particularly preferably 60 to 120° C., at a slurry concentration of usually 0.05 to 0.7 g-solid/mL-solvent, and particularly preferably 0.1 to 0.5 g-solid/mL-solvent, for an unrestricted time, preferably for about 30 minutes to about 6 hours. The above contact time means a contact time in the following cases:

(i) in case that the titanium compound, magnesium compound and internal electron donor are contacted at one time with one another, such a contact time corresponds to the above contact time; and (ii) in case that the titanium compound, magnesium compound and internal electron donor are contacted sequentially with one another, the contact time means a time between the beginning of supplying a finally-contacted compound and the ending of the contact step.

The above mechanically pulverizing method is carried out preferably in the presence of a liquid material, in order to suppress generation of fine powder, which generation results in a solid catalyst component having a too broad particle size distribution. Examples of the liquid material are an aliphatic hydrocarbon such as pentane, hexane, heptane and octane; an aromatic hydrocarbon such as benzene, toluene and xylene; an alicyclic hydrocarbon such as cyclohexane and cyclopentane; and a halogenated hydrocarbon such as 1,2-dichloroethane and monochlorobenzene. Among them, particularly preferred is an aromatic hydrocarbon or a halogenated hydrocarbon.

Catalyst component production process-1 may use optionally a compound represented by following formula (iii) in its contacting step:

$$MR^2{}_b X^2{}_b \qquad \text{(iii)}$$

wherein M is an atom of group 13 or 14; $R^2$ is a hydrocarbyl group or hydrocarbyloxy group having 1 to 20 carbon atoms; $X^2$ is a halogen atom; m is a valence of M; and b is an integer satisfying $0<b\leqq m$.

Examples of the atom of group 13 of M are boron, aluminum, gallium, indium, and thallium. Among them, preferred is boron or aluminum, and more preferred is aluminum. Examples of the atom of group 14 of M are silicon, germanium, tin, and lead. Among them, preferred is silicon, germanium or tin, and more preferred is silicon.

Examples of the hydrocarbyl group of $R^2$ are a linear or branched alkyl group such as a methyl group, an ethyl group, a propyl group, an isopropyl group, a butyl group, an isobutyl group, a pentyl group, an isopentyl group, a hexyl group, a heptyl group, an octyl group, a decyl group, and a dodecyl group; a cycloalkyl group such as a cyclohexyl group and a cyclopentyl group; an aryl group such as a phenyl group, a cresyl group, a xylyl group, and a naphthyl group. Examples of the hydrocarbyloxy group of $R^2$ are a linear or branched alkoxy group such as a methoxy group, an ethoxy group, a propoxy group, an isopropoxy group, a butoxy group, an isobutoxy group, an amyloxy group, an isoamyloxy group, a hexyloxy group, a heptyloxy group, an octyloxy group, a decyloxy group, and a dodecyloxy group; a cycloalkoxy group such as a cyclohexyloxy group and a cyclopentyloxy group; and an aryloxy group such as a phenoxy group, a xyloxy group, and a naphthoxy group. Among them, preferred is an alkyl group or an alkoxy group having 2 to 18 carbon atoms, or an aryl group or an aryloxy group having 6 to 18 carbon atoms.

Examples of $X^2$ are a fluorine atom, a chlorine atom, a bromine atom, and an iodine atom. Among them, preferred is a chlorine atom or a bromine atom.

When M is an atom of group 13, m is 3, and b is an integer satisfying 0<b≦3, and is preferably 3. When M is an atom of group 14, m is 4, and b is an integer satisfying 0<b≦4, and is preferably 3 or 4, and more preferably 4.

Examples of the compound represented by above formula (iii) are a chlorinated aluminum compound and a chlorinated silicon compound. Among them, preferred is ethylaluminum dichloride, ethylaluminum sesquichloride, diethylaluminum chloride, trichloroaluminum, tetrachlorosilane, phenyltrichlorosilane, methyltrichlorosilane, ethyltrichlorosilane, n-propyltrichlorosilane, or p-tolyltrichlorosilane, more preferred is a chlorinated compound containing a group 14 atom, and particularly preferred is tetrachlorosilane or phenyltrichlorosilane.

The compound represented by above formula (iii) is used, in catalyst component production process-1, in an amount of usually 0.1 to 1,000 mmol, preferably 0.3 to 500 mmol, and particularly preferably 0.5 to 300 mmol, per one mol of a magnesium atom contained in the magnesium compound used. The compound is used at one time, or in two or more batches.

The solid component containing a titanium atom and a magnesium atom used in catalyst component production process-2 is not particularly limited, as long as the solid component contains a titanium atom and a magnesium atom. Examples of the solid component are magnesium titanate; aluminum magnesium titanate disclosed in WO 2004/039747; and a solid catalyst component precursor containing a trivalent titanium atom, a magnesium atom and a hydrocarbyloxy group. Among them, preferred is the solid catalyst component precursor. The "solid catalyst component precursor" means a precursor for producing a solid catalyst component, and is hereinafter referred to merely as a "precursor".

Examples of the hydrocarbyloxy group contained in the precursor are hydrocarbyloxy groups having 1 to 20 carbon atoms. Among them, preferred is a methoxy group, an ethoxy group, a n-propoxy group, an isopropoxy group, a n-butoxy group, an isobutoxy group, a pentyloxy group, a cyclopentyloxy group, or a cyclohexyloxy group.

The precursor is not particularly restricted in its production process, and can be produced, for example, by a process comprising a step of reducing a titanium compound with an organomagnesium compound in the presence of a silicon compound containing a Si—O bond. Such a reduction reaction is carried out preferably by adding the organomagnesium compound to a solution of the titanium compound and the silicon compound in a solvent.

Examples of such a silicon compound are those represented by following formula (iv), (v) or (vi):

wherein $R^3$, $R^4$, $R^5$, $R^6$, $R^7$ and $R^8$ are independently of one another a hydrogen atom or a hydrocarbyl group having 1 to 20 carbon atoms; t is an integer of 1 to 4; u is an integer of 1 to 1,000; and v is an integer of 2 to 1,000.

Examples of the above hydrocarbyl group are an alkyl group such as a methyl group, an ethyl group, a n-propyl group, an isopropyl group, a n-butyl group, an isobutyl group, a n-pentyl group, an isopentyl group, a hexyl group, a heptyl group, an octyl group, a decyl group, and a dodecy group; an aryl group such as a pheny group, a tolyl group, a xylyl group, a mesityl group, and a naphthyl group; a cycloalkyl group such as a cyclohexyl group and a cyclopentyl group; an alkenyl group such as an allyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of the silicon compound represented by above formula (iv), (v) or (vi) are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, and phenylhydropolysiloxane. Among them, preferred is a compound represented by formula (iv), provided that t is 4(tetraalkoxysilane), and most preferred is tetraethoxysilane.

An example of the above titanium compound to produce the precursor is a compound represented by following formula (vii):

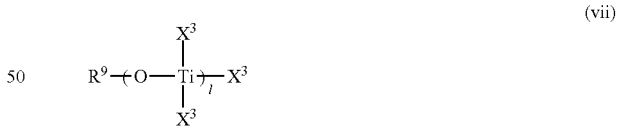

wherein $R^9$ is a hydrocarbyl group having 1 to 20 carbon atoms; $X^3$ is a halogen atom, or a hydrocarbyloxy group having 1 to 20 carbon atoms, and plural $X^3$s are the same as, or different from one another; and l is an integer of 1 to 20.

Examples of $R^9$ are an alkyl group such as a methyl group, an ethyl group, a n-propyl group, an isopropyl group, a n-butyl group, an isobutyl group, a n-pentyl group, an isopentyl group, a hexyl group, a heptyl group, an octyl group, a decyl group, and a dodecy group; an aryl group such as a pheny group, a tolyl group, a xylyl group, a mesityl group, and a naphthy group; a cycloalkyl group such as a cyclohexyl group and a cyclopentyl group; an alkenyl group such as an allyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of the halogen atom of $X^3$ are a chlorine atom, a bromine atom, and an iodine atom. Among them, particularly preferred is a chlorine atom.

The hydrocarbyloxy group of $X^3$ is preferably an alkoxy group having 2 to 18 carbon atoms, more preferably an alkoxy group having 2 to 10 carbon atoms, and particularly preferably an alkoxy group having 2 to 6 carbon atoms.

Examples of the titanium compound represented by above formula (vii) are tetramethoxytitanium, tetraethoxytitanium, tetra-n-propoxytitanium, tetraisopropoxytitanium, tetra-n-butoxytitanium, tetraisobutoxytitanium, n-butoxytitanium trichloride, di-n-butoxytitanium dichloride, tri-n-butoxytitanium chloride, di-n-tetraisopropylpolytitanate (mixture of compounds having "1" of 2 to 10 in the above formula (vii)), tetra-n-butylpolytitanate (mixture of compounds having "1" of 2 to 10 therein), tetra-n-hexylpolytitanate (mixture of compounds having "1" of 2 to 10 therein), and tetra-n-octylpolytitanate (mixture of compounds having "1" of 2 to 10 therein), a condensate obtained by reacting a tetraalkoxytitanium with a small amount of water, and a combination of two or more thereof.

The titanium compound represented by above formula (vii) is preferably a titanium compound having "1" of 1, 2 or 4 in formula (vii), and more preferably tetra-n-butoxytitanium, tetra-n-butyltitanium dimer, or tetra-n-butyltitanium tetramer.

The organomagnesium compound to produce the precursor is not particularly restricted in its kind, as long as the compound contains a magnesium-carbon bond (Mg—C bond). Examples thereof are those represented by following formula (viii) or (ix), and among them, preferred is a Grignard compound represented by formula (viii) for producing a precursor excellent in its shape, and particularly preferred is an ether solution of a Grignard compound:

$R^{10}MgX^4$ (viii)

$R^{11}R^{12}Mg$ (ix)

wherein $R^{10}$, $R^{11}$ are $R^{12}$ are a hydrocarbyl group having 1 to 20 carbon atoms; and $X^4$ is a halogen atom.

Examples of the above hydrocarbyl group are an alkyl group, an aryl group, an aralkyl group, and an alkenyl group having 1 to 20 carbon atoms such as a methyl group, an ethyl group, a propyl group, an isopropyl group, a butyl group, a sec-butyl group, a tert-butyl group, an isopentyl group, a n-hexyl group, a n-octyl group, a 2-ethylhexyl group, a phenyl group, an allyl group, and a benzyl group. Among them, preferred is an alkyl group having 2 to 18 carbon atoms, or an ary group having 6 to 18 carbon atoms, and particularly preferred is an alkyl group having 2 to 18 carbon atoms.

Examples of above $X^4$ are a chlorine atom, a bromine atom, and an iodine atom. Among them, particularly preferred is a chlorine atom.

Examples of a Grignard compound represented by above formula (viii) are methylmagnesium chloride, ethylmagnesium chloride, n-propylmagnesium chloride, isopropylmagnesium chloride, n-butylmagnesium chloride, isobutylmagnesium chloride, tert-butylmagnesium chloride, n-pentylmagnesium chloride, isopentylmagnesium chloride, cyclopentylmagnesium chloride, n-hexylmagnesium chloride, cyclohexylmagnesium chloride, n-octylmagnesium chloride, 2-ethylhexylmagnesium chloride, phenylmagnesium chloride, and benzylmagnesium chloride. Among them, preferred is ethylmagnesium chloride, n-propylmagnesium chloride, isopropylmagnesium chloride, n-butylmagnesium chloride, or isobutylmagnesium chloride, and particularly preferred is n-butylmagnesium chloride.

Those Grignard compounds are used preferably as an ether solution thereof. Examples of the ether are a dialkyl ether such as diethyl ether, di-n-propyl ether, diisopropyl ether, di-n-butyl ether, diisobutyl ether, ethyl n-butyl ether, and diisopentyl ether; and a cyclic ether such as tetrahydrofuran. Among them, preferred are a dialkyl ether, and particularly preferred is di-n-butyl ether or diisobutyl ether.

The above reduction reaction may be carried out in the presence of an ester group-carrying compound. The ester group-carrying compound is not particularly restricted in its kind. Examples thereof are a monocarboxylic acid ester and a polycarboxylic acid ester, and specific examples thereof are a saturated aliphatic carboxylic acid ester, an unsaturated aliphatic carboxylic acid ester, an alicyclic carboxylic acid ester, and an aromatic carboxylic acid ester. More specific examples thereof are that represented by formula (1), and methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, di-n-octyl phthalate, di(2-ethylhexyl)phthalate, diisodecyl phthalate, dicyclohexyl phthalate, and diphenyl phthalate. Among them, preferred is an aliphatic dicarboxylic acid diester such as that represented by formula (1), or an aromatic dicarboxylic acid diester such as a phthalic acid ester.

Examples of a solvent of the reduction reaction are an aliphatic hydrocarbon such as hexane, heptane, octane, and decane; an aromatic hydrocarbon such as toluene and xylene; an alicyclic hydrocarbon such as cyclohexane, methylcyclohexane and decalin; a dialkyl ether such as diethyl ether, di-n-propyl ether, diisopropyl ether, di-n-butyl ether, diisobutyl ether, ethyl n-butyl ether, and diisopentyl ether; a cyclic ether such as tetrahydrofuran; a halogenated aromatic compound such as chlorobenzene and dichlobenzene; and a combination of two or more thereof. Among them, preferred is an aliphatic hydrocarbon, an aromatic hydrocarbon, or an alicyclic hydrocarbon, more preferred is an aliphatic hydrocarbon or an alicyclic hydrocarbon, further preferred is an aliphatic hydrocarbon, and particularly preferred is hexane or heptane.

The silicon compound in the reduction reaction is used in an amount of usually 1 to 500 mol, preferably 1 to 300 mol, and particularly preferably 3 to 100 mol, in terms of an amount of a silicon atom contained in the silicon compound used, per one mol of a titanium atom contained in the titanium compound used.

The organomagnesium compound in the reduction reaction is used in an amount of usually 0.1 to 10 mol, preferably 0.2 to 5.0 mol, and particularly preferably 0.5 to 2.0 mol, in terms of a molar amount of a magnesium atom contained in the organomagnesium compound used, per one mole of the total of a titanium atom contained in the titanium compound and a silicon atom contained in the silicon compound.

Each of the titanium compound, the silicon compound and the organomagnesium compound in the reduction reaction is used in an amount such that a precursor obtained contains a magnesium atom in an amount of usually 1 to 51 mol, preferably 2 to 31 mol, and particularly preferably 4 to 26 mol, per one mol of a titanium atom contained in the precursor.

The ester group-carrying compound in the reduction reaction is used in an amount of usually 0.05 to 100 mol, preferably 0.1 to 60 mol, and particularly preferably 0.2 to 30 mol, per one mol of a titanium atom contained in the titanium compound used.

The organomagnesium compound is added to a solution containing the titanium compound and silicon compound, at usually −50 to 100° C., preferably −30 to 70° C., and particularly preferably −25 to 50° C., over an unrestricted time, usually over about 30 minutes to about 6 hours. The organomagnesium compound is added thereto preferably continuously in order to produce a precursor excellent in its shape. The obtained reaction mixture may be further heated at 5 to 120° C. to promote the reduction reaction.

The reduction reaction may be carries out in the presence of a support in order to obtain a precursor supported thereon. The support is not particularly limited in its kind, and examples thereof are a porous inorganic oxide such as $SiO_2$, $Al_2O_3$, MgO, $TiO_2$ and $ZrO_2$; and a porous organic polymer such as polystyrene, a styrene-divinylbenzene copolymer, a styrene-ethylene dimethacrylate copolymer, polymethyl acrylate, polyethyl acrylate, a methyl acrylate-divinylbenzene copolymer, polymethyl methacrylate, a methyl methacrylate-divinylbenzene copolymer, polyacrylonitrile, an acrylonitrile-divinylbenzene copolymer, polyvinyl chloride, polyethylene and polypropylene. Among them, preferred is a porous organic polymer, and particularly preferred is a styrene-divinylbenzene copolymer.

In order to support effectively a precursor on a support, the support has a pore volume of preferably 0.3 cm³/g or more, and more preferably 0.4 cm³/g or more, in a pore radius range of 20 to 200 nm, a proportion of which pore volume is preferably 35% or more, and more preferably 40% or more, provided that a proportion of its pore volume in a pore radius range of 3.5 to 7,500 nm is 100%.

The reduction reaction reduces a tetravalent titanium atom contained in the titanium compound represented by formula (vii) to a trivalent titanium atom. It is preferable in the present invention that substantially all tetravalent titanium atoms contained in the titanium compound are reduced to trivalent titanium atoms. The obtained precursor contains a trivalent titanium atom, a magnesium atom, and a hydrocarbyloxy group, and is generally amorphous or extremely week crystalline, and preferably amorphous.

The obtained precursor may be washed with a solvent. Examples of the solvent are an aliphatic hydrocarbon such as pentane, hexane, heptane, octane and decane; an aromatic hydrocarbon such as benzene, toluene, ethylbenzene and xylene; an alicyclic hydrocarbon such as cyclohexane and cyclopentane; and a halogenated hydrocarbon such as 1,2-dichloroethane and monochlorobenzene. Among them, preferred is an aliphatic hydrocarbon or an aromatic hydrocarbon, more preferred is an aromatic hydrocarbon, and particularly preferred is toluene or xylene.

The internal electron donor represented by formula (I) in catalyst component production process-2 is used in an amount of usually 1 to 1,000 mmol, preferably 0.3 to 500 mmol, and particularly preferably 0.5 to 300 mmol, per one gram of the solid component. The internal electron donor is used at one time, or in two or more batches.

Catalyst component production process-2 is not particularly restricted in its contact temperature, and usually −50 to 200° C., preferably 0 to 170° C., more preferably 50 to 150° C., and particularly preferably 50 to 120° C., and is not particularly restricted in its contact time, and usually 10 minutes to 12 hours, preferably 30 minutes to 10 hours, and particularly preferably 1 to 8 hours.

Catalyst component production process-2 may use optionally a halogenated metal compound represented by following formula (x) in its contacting step:

$$M^1 R^{13}{}_{k-c} X^5{}_c \qquad (x)$$

wherein $M^1$ is an atom of group 4, 13 or 14; $R^{13}$ is a hydrocarbyl group or a hydrocarbyloxy group having 1 to 20 carbon atoms; $X^5$ is a halogen atom; k is a valence of $M^1$; and c is an integer satisfying $0<c\leq k$.

Examples of the atom of group 4 of $M^1$ are titanium, zirconium and hafnium. Among them, preferred is titanium. Examples of the atom of group 13 of $M^1$ are boron, aluminum, gallium, indium, and thallium. Among them, preferred is boron or aluminum, and more preferred is aluminum. Examples of the atom of group 14 of $M^1$ are silicon, germanium, tin, and lead. Among them, preferred is silicon, germanium or tin, and more preferred is silicon.

Examples of the hydrocarbyl group of $R^{13}$ are a linear or branched alkyl group such as a methyl group, an ethyl group, a n-propyl group, an isopropyl group, a n-butyl group, an isobutyl group, a n-pentyl group, an isopentyl group, a n-hexyl group, a n-heptyl group, a n-octyl group, a n-decyl group, and a n-dodecyl group; a cycloalkyl group such as a cyclohexyl group and a cyclopentyl group; and an aryl group such as a pheny group, a tolyl group, a xylyl group, a mesityl group, and a naphthy group. Examples of the hydrocarbyloxy group of $R^{13}$ are a linear or branched alkoxy group such as a methoxy group, an ethoxy group, a propoxy group, an isopropoxy group, a butoxy group, an isobutoxy group, an amyloxy group, an isoamyloxy group, a hexyloxy group, a heptyloxy group, an octyloxy group, a decyloxy group, and a dodecyloxy group; a cycloalkoxy group such as a cyclohexyloxy group and a cyclopentyloxy group; and an aryloxy group such as a phenyoxy group, a tolyloxy group, a xylyloxy group, a mesityloxy group, and a naphthyoxy group. Among them, preferred is an alkyl group or an alkoxy group having 2 to 18 carbon atoms, or an aryl group or an aryloxy group having 6 to 18 carbon atoms.

Examples of above $X^5$ are a fluorine atom, a chlorine atom, a bromine atom, and an iodine atom. Among them, preferred is a chlorine atom or a bromine atom.

When above $M^1$ is an atom of group 4, 13 or 14, k is 4, 3 or 4, respectively. When $M^1$ is an atom of group 4 or 14, above c is an integer satisfying $0<c\leq 4$, preferably 3 or 4, and more preferably 4. When $M^1$ is an atom of group 13, c is an integer satisfying $0<c\leq 3$, and preferably 3.

Examples of the halogenated metal compound represented by above formula (x) are titanium compounds disclosed in U.S. Pat. No. 6,187,883, and chlorinated compounds of group 13 or 14 disclosed in U.S. Pat. No. 6,903,041.

A halogenated titanium compound of the halogenated metal compound represented by above formula (x) is preferably a titanium tetrahalide such as titanium tetrachloride, titanium tetrabromide and titanium tetraiodide; or an alkoxytitanium trihalide such as methoxytitanium trichloride, ethoxytitanium trichloride, butoxytitanium trichloride, phenoxytitanium trichloride and ethoxytitanium tribromide, more preferably a titanium tetrahalide, and particularly preferably titanium tetrachloride.

A chlorinated compound of an atom of group 13 or 14 of the halogenated metal compound represented by above formula (x) is preferably ethylaluminum dichloride, ethylaluminum sesquichloride, diethylaluminum chloride, trichloaluminum, tetrachlorosilane, phenyltrichlorosilane, methyltrichlorosilane, ethyltrichlorosilane, n-propyltrichlorosilane, or p-tolyltrichlorosilane; more preferably a chlorinated compound of an atom of group 14; and particularly preferably tetrachlorosilane or phenyltrichlorosilane.

The halogenated metal compound represented by formula (x) is used in an amount of usually 0.1 to 1,000 mmol, preferably 0.3 to 500 mmol, and particularly preferably 0.5 to 300 mmol, per one gram of the precursor. The halogenated metal compound is used at one time, or in two or more batches.

Catalyst component production process-2 is not particularly limited in its contact method. Examples thereof are those known in the art such as (2-1) a slurry method, and (2-2) a mechanically pulverizing method using a ball mill. The mechanically pulverizing method is carried out preferably in the presence of the above-mentioned liquid material, in order to suppress generation of fine powder, which generation results in a solid catalyst component having a too broad particle size distribution.

The above slurry method comprises a step of contacting a solid component containing a titanium atom and a magnesium atom with an internal electron donor in a slurry state, at usually 30 to 150° C., preferably 45 to 135° C., and particularly preferably 60 to 120° C., at a slurry concentration of usually 0.05 to 0.7 g-solid/mL-solvent, and particularly preferably 0.1 to 0.5 g-solid/mL-solvent, for an unrestricted time, preferably for about 30 minutes to about 6 hours.

The solid catalyst component in the present invention is reacted with an organoaluminum compound and an optionally-used external electron donor by contacting them according to a contact method known in the art, thereby forming a solid catalyst.

Examples of the organoaluminum compound used in the present invention are those disclosed in U.S. Pat. No. 6,903,041 mentioned above. Among them, preferred is a trialkylaluminum, a mixture of trialkylaluminum with a dialkylaluminum halide, or an alkylalumoxane; and further preferred is triethylaluminum, triisobutylaluminum, a mixture of triethylaluminum with diethylaluminum chloride, or tetraethyldialumoxane.

Examples of the above external electron donor optionally used in the present invention are those disclosed in U.S. Pat. No. 6,903,041 mentioned above. Among them, preferred is an oxygen-containing compound or a nitrogen-containing compound. Examples of the oxygen-containing compound are an alkoxysilicon, an ether, an ester and a ketone. Among them, preferred is an alkoxysilicon or an ether.

The alkoxysilicon as the external electron donor is preferably a compound represented by following formula (xi), (xii) or (xiii):

$R^{14}_h Si(OR^{15})_{4-h}$ (xi)

$Si(OR^{16})_3(NR^{17}R^{18})$ (xii)

$Si(OR^{16})_3(NR^{19})$ (xiii)

wherein $R^{14}$ is a hydrogen atom or a hydrocarbyl group having 1 to 20 carbon atoms; $R^{15}$ is a hydrocarbyl group having 1 to 20 carbon atoms; h is an integer satisfying $0 \leq h < 4$; when plural $R^{14}$s or $R^{15}$s exist, they are the same as, or different from one another; $R^{16}$ is a hydrocarbyl group having 1 to 6 carbon atoms; $R^{17}$ and $R^{18}$ are a hydrogen atom or a hydrocarbyl group having 1 to 12 carbon atoms; and $NR^{19}$ is a cyclic amino group having 5 to 20 carbon atoms, $R^{19}$ being a divalent group.

Examples of the hydrocarbyl group of $R^{14}$ and $R^{15}$ in formula (xi) are an alkyl group, an aralkyl group, an aryl group, and an alkenyl group. Examples of the alkyl group are a linear alkyl group such as a methyl group, an ethyl group, a n-propyl group, a n-butyl group, a n-pentyl group, a n-hexyl group, a n-heptyl group, and a n-octyl group; a branched alkyl group such as an isopropyl group, an isobutyl group, a tert-butyl group, an isopentyl group, a neopentyl group, and a 2-ethylhexyl group; and a cycloalkyl group such as a cyclopropyl group, a cyclobutyl group, a cyclopentyl group, a cyclohexyl group, a cycloheptyl group, and a cyclooctyl group. Among them, preferred is a linear, branched or cycloalkyl group having 1 to 20 carbon atoms. Examples of the above aralkyl group are a benzyl group and a phenethyl group. Among them, preferred is an aralkyl group having 7 to 10 carbon atoms. Examples of the above aryl group are a pheny group, a tolyl group, a xylyl group, a mesityl group, and a naphthy group. Among them, preferred is an aryl group having 6 to 10 carbon atoms. Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is an alkenyl group having 2 to 10 carbon atoms.

Examples of the alkoxysilicon represented by formula (xi) are cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, vinyltriethoxysilane, cyclohexyltriethoxysilane, cyclopentyltriethoxysilane, methyltriethoxysilane, ethyltriethoxysilane, isobutyltriethoxysilane, sec-butyltriethoxysilane, and tetraethoxysilane.

Examples of the hydrocarbyl group of $R^{16}$ in formulas (xii) and (xiii) are an alkyl group and an alkenyl group. Examples of the alkyl group are a linear alkyl group such as a methyl group, an ethyl group, a n-propyl group, a n-butyl group, a n-pentyl group, and a n-hexyl group; a branched alkyl group such as an isopropyl group, an isobutyl group, a tert-butyl group, an isopentyl group, and a neopentyl group; and a cycloalkyl group such as a cyclopropyl group, a cyclobutyl group, a cyclopentyl group, and a cyclohexyl group. Among them, preferred is a linear alkyl group having 1 to 6 carbon atoms. Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is an alkenyl group having 2 to 10 carbon atoms.

Examples of the hydrocarbyl group of $R^{17}$ and $R^{18}$ in formula (xii) are an alkyl group and an alkenyl group. Examples of the alkyl group are a linear alkyl group such as a methyl group, an ethyl group, a n-propyl group, a n-butyl group, a n-pentyl group, and a n-hexyl group; a branched alkyl group such as an isopropyl group, an isobutyl group, a tert-butyl group, an isopentyl group, and a neopentyl group; and a cycloalkyl group such as a cyclopropyl group, a cyclobutyl group, a cyclopentyl group, and a cyclohexyl group. Among them, preferred is a linear alkyl group having 1 to 6 carbon atoms. Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is an alkenyl group having 2 to 10 carbon atoms.

Examples of the alkoxysilicon represented by formula (xii) are dimethylaminotrimethoxysilane, diethylaminotrimethoxysilane, di-n-propylaminotrimethoxysilane, dimethylaminotriethoxysilane, diethylaminotriethoxysilane, di-n-propylaminotriethoxysilane, methylethylaminotriethoxysilane, methyl-n-propylaminotriethoxysilane, tert-butylaminotriethoxysilane, diisopropylaminotriethoxysilane, and methylisopropylaminotriethoxysilane.

Examples of the cyclic amino group of $NR^{19}$ in formula (xiii) are a perhydroquinolino group, a perhydroisoquinolino group, a 1,2,3,4-tetrahydroquinolino group, a 1,2,3,4-tetrahydroisoquinolino group, and an octamethyleneimino group.

Examples of the alkoxysilicon represented by formula (xiii) are perhydroquinolinotriethoxysilane, perhydroisoquinolinotriethoxysilane, 1,2,3,4-tetrahydroquinolinotriethoxysilane, 1,2,3,4-tetrahydroisoquinolinotriethoxysilane, and octamethyleneiminotriethoxysilane.

The above ether as the external electron donor is preferably a cyclic ether, which is a heterocyclic compound containing one or more —C—O—C— bonds in its cyclic structure, and more preferably a cyclic ether containing one or more —C—O—C—O—C— bonds in its cyclic structure.

The external electron donor is particularly preferably cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, 1,3-dioxolane, or 1,3-dioxane. Those compounds are used singly, or in combination of two or more thereof.

The process for producing a solid catalyst of the present invention is not particularly restricted in its method for contacting the solid catalyst component, the organoaluminum compound and the optionally-used external electron donor with one another, as long as a solid catalyst is formed. Such a contact is carried out with or without the use of a solvent. Examples of a method for feeding the solid catalyst component, the organoaluminum compound and the external electron donor to a polymerization reactor are (i) a method comprising steps of contacting all of them with one another to form a contact product, and feeding the contact product to the polymerization reactor, (ii) a method comprising a step of feeding them separately to the polymerization reactor, thereby contacting them therein with one another, and (iii) a method comprising steps of contacting any two of them with each other to form a contact product, and feeding the contact product and the remaining compound or electron donor separately to the polymerization reactor, thereby contacting them therein with each other.

Examples of the olefin used in the process for producing an olefin polymer of the present invention are ethylene and an α-olefin having three or more carbon atoms. Examples of the α-olefin are a linear mono-olefin such as propylene, 1-butene, 1-pentene, 1-hexene, 1-heptene, 1-octene and 1-decene; a branched mono-olefin such as 3-methyl-1-butene, 3-methyl-1-pentene and 4-methyl-1-pentene; a cyclic mono-olefin such as vinylcyclohexane; and combinations of two or more of those olefins. Among them, preferred is an ethylene homopolymer, a propylene homopolymer, or a copolymer of a combination of two or more kinds of olefins, the combination containing ethylene or propylene as a major monomer; and more preferred is an ethylene copolymer containing 50% by weight or more of an ethylene polymerization unit, provided that the total of a monomer polymerization unit contained in the copolymer is 100% by weight. The above combination of two or more kinds of olefins may contain two or more kinds of α-olefins except propylene, and may contain a monomer having two or more unsaturated bond, such as a conjugated diene monomer and a non-conjugated diene monomer.

An olefin polymer produced by the process of the present invention is preferably an ethylene homopolymer, a propylene homopolymer, a 1-butene homopolymer, a 1-pentene homopolymer, a 1-hexene homopolymer, an ethylene-propylene copolymer, an ethylene-1-butene copolymer, an ethylene-1-hexene copolymer, a propylene-1-butene copolymer, a propylene-1-hexene copolymer, an ethylene-propylene-1-butene copolymer, an ethylene-propylene-1-hexene copolymer, or a polymer produced by a production method comprising steps of (i) polymerizing propylene, thereby producing a propylene homopolymer, and (ii) copolymerizing propylene with ethylene in the presence of the propylene homopolymer.

The production process of a solid catalyst of the present invention uses the above-explained solid catalyst component. However, the solid catalyst component can be replaced with the below-explained "pre-polymerized solid catalyst component" in accordance with an intended use.

The pre-polymerized solid catalyst component can be produced by pre-polymerization of a small amount of an olefin in the presence of the above-explained solid catalyst component and the above-explained organoaluminum compound, wherein (i) the term "pre-polymerization" is in contrast to the polymerization in the production process of an olefin polymer of the present invention, which polymerization is referred to as "main polymerization", (ii) the olefin used in the pre-polymerization is the same as, or different from an olefin used in the main polymerization, (iii) the pre-polymerization can use a chain-transfer agent such as hydrogen in order to regulate a molecular weight of a pre-polymerized olefin polymer, (iv) the pre-polymerization can use an external electron donor, and (v) the pre-polymerized solid catalyst component can be considered to be a solid catalyst component whose surface is covered with the pre-polymerized olefin polymer.

Therefore, the term "solid catalyst component" used in the production process of a solid catalyst of the present invention means not only the "solid catalyst component" but also the above-explained "pre-polymerized solid catalyst component" or a combination of those two catalyst components.

The above pre-polymerization is preferably slurry polymerization with the use of an inert hydrocarbon as a solvent, such as propane, butane, isobutane, pentane, isopentane, hexane, heptane, octane, cyclohexane, benzene, and toluene.

The organoaluminum compound in the pre-polymerization is used in an amount of usually 0.5 to 700 mol, preferably 0.8 to 500 mol, and particularly preferably 1 to 200 mol, per one mol of a titanium atom contained in the solid catalyst component used in the pre-polymerization.

The olefin in the pre-polymerization is used in an amount of usually 0.01 to 1,000 g, preferably 0.05 to 500 g, and particularly preferably 0.1 to 200 g, per one gram of the solid catalyst component used in the pre-polymerization.

The pre-polymerization is preferably slurry polymerization, and a concentration of the solid catalyst component in the slurry is preferably 1 to 500 g-solid catalyst component/liter-solvent, and particularly preferably 3 to 300 g-solid catalyst component/liter-solvent.

The pre-polymerization is carried out at preferably −20 to 100° C., and particularly preferably 0 to 80° C., for an unrestricted time, and preferably for 2 minutes to 15 hours, and under a partial pressure of an olefin in a gas phase of preferably 0.01 to 2 MPa, and particularly preferably 0.1 to 1 MPa, provided that an olefin in a liquid state under pre-polymerization temperature and pressure is not limited thereto.

Examples of a method for feeding the solid catalyst component, organoaluminum compound and olefin to a pre-polymerization reactor are (i) a method comprising steps of feeding the solid catalyst component and organoaluminum compound, and then feeding the olefin, and (ii) a method comprising steps of feeding the solid catalyst component and olefin, and then feeding the organoaluminum compound.

Examples of a method for feeding the olefin to a pre-polymerization reactor are (i) a method of feeding the olefin sequentially to the pre-polymerization reactor, so as to keep an inner pressure of the pre-polymerization reactor at a predetermined level, and (ii) a method of feeding thereto a predetermined total amount of the olefin at a time. The external electron donor compound in the pre-polymerization is optionally used in an amount of generally 0.01 to 400 mol, preferably 0.02 to 200 mol, and particularly preferably 0.03 to 100 mol, per one mol of a titanium atom containing in the solid catalyst component used in the pre-polymerization, and is used in an amount of generally 0.003 to 5 mol, preferably 0.005 to 3 mol, and particularly preferably 0.01 to 2 mol, per one mol of the organoaluminum compound used in the pre-polymerization.

Examples of a method for feeding the external electron donor compound to a pre-polymerization reactor are (i) a method of feeding separately the external electron donor compound to the pre-polymerization reactor, and (ii) a method of feeding a contact product of the external electron donor compound with the organoaluminum compound to the pre-polymerization reactor.

Pre-polymerization is disclosed in JP 11-322833A.

The organoaluminum compound in the main polymerization is used in an amount of usually 1 to 1,000 mol, and particularly preferably 5 to 600 mol, per one mol of a titanium atom contained in the solid catalyst component used in the main polymerization.

The external electron donor in the main polymerization is used in an amount of usually 0.1 to 2,000 mol, preferably 0.3 to 1,000 mol, and particularly preferably 0.5 to 800 mol, per one mol of a titanium atom contained in the solid catalyst component used in the main polymerization, or is used in an amount of usually 0.001 to 5 mol, preferably 0.005 to 3 mol, and particularly preferably 0.01 to 1 mol, per one mol of the organoaluminum compound used in the main polymerization.

The main polymerization is carried out batch-wise or continuously, (1) at usually −30 to 300° C., and preferably 20 to 180° C., (2) under a pressure, which is not particularly restricted, of usually atmospheric pressure to 10 MPa, and preferably 200 kPa to 5 MPa, from an industrial and economical point of view, (3) according to (3-1) a slurry or solution polymerization method with the use of an inert hydrocarbon solvent such as propane, butane, isobutane, pentane, hexane, heptane and octane, (3-2) a bulk polymerization method using an olefin as a solvent, which is liquid at polymerization temperature, or (3-3) a gas-phase polymerization method, and (4) with or without the use of a chain transfer agent such as hydrogen and an alkyl zinc (for example, dimethyl zinc and diethyl zinc) in order to control a molecular weight of an olefin polymer produced in the main polymerization.

According to the present invention, there can be provided (i) a solid catalyst component for olefin polymerization, which is high in its polymerization activity, and produces an olefin polymer containing only a small amount of a material (such as a low-molecular weight material and an amorphous material) soluble in a low-temperature organic solvent, (ii) a process for producing a solid catalyst component for olefin polymerization, (iii) a process for producing a solid catalyst for olefin polymerization, and (iv) a process for producing an olefin polymer.

EXAMPLE

The present invention is explained in more detail with reference to the following Examples, which do not limit the present invention.

Example 1

(1) Production of Solid Catalyst Component Precursor

A reactor equipped with a stirrer was purged with nitrogen gas. To the reactor were charged 270 mL of hexane, 79.9 mL of tetraethoxysilane and 8.1 mL of tetrabutoxytitanium, and the resultant mixture was stirred. To the mixture was added drop-wise 182 mL of a dibuthy ether solution (concentration: 2.1 mol/L) of butylmagnesium chloride over four hours at 5° C. After completion of the addition, the reaction mixture was stirred at 20° C. for one hour, and then was filtered, thereby obtaining a solid catalyst component precursor corresponding to the "solid component" in the present invention. The solid catalyst component precursor was washed three times with each 280 mL of toluene. To the washed solid was added 136 mL of toluene, thereby obtaining toluene slurry of the solid catalyst component precursor.

(2) Production of Solid Catalyst Component

A 100 mL-flask equipped with a stirrer, a dropping funnel and a thermometer was purged with nitrogen gas. To the flask was charged the above-obtained toluene slurry containing 7 g of the solid catalyst component precursor. The toluene slurry was condensed by distilling away toluene to the total volume of 40.6 mL of the toluene slurry. To the slurry was added 4.5 mL of dodecanedioyl dichloride (internal electron donor), and the mixture was stirred at 105° C. for three hours. The resultant mixture was solid-liquid separated, and the separated solid was washed three times at 105° C. with each 30 mL of toluene. To the washed solid was added 20 mL of toluene, and the mixture was heated up to 70° C. To the mixture was added 3.5 m of titanium tetrachloride, and the mixture was stirred at 105° C. for one hour. The resultant mixture was solid-liquid separated, and the separated solid was washed six times at 105° C. with each 30 mL of toluene, and was further washed three times at room temperature with each 30 mL of hexane. The washed solid was dried, thereby obtaining a solid catalyst component.

(3) Polymerization of Ethylene with 1-butene

A 3 liter-autoclave equipped with a stirrer was dried thoroughly, and then was evacuated. To the autoclave were charged 0.087 MPa of hydrogen, 640 g of butane, and 110 g of 1-butene in this order. The autoclave was heated up to 70° C., and ethylene was added thereto such that its partial pressure was 0.6 MPa. Into the autoclave were pressed with argon 5.7 mmol of triethylaluminum (ogranoaluminum compound) and 3.40 mg of the above-obtained solid catalyst component, thereby initiating polymerization. While feeding ethylene continuously under keeping the total pressure constant, the polymerization was continued for 120 minutes at 70° C.

After the polymerization was completed, the remaining monomer was purged, thereby obtaining 33 g of an ethylene-1-butene copolymer having a good powder characteristic. There was hardly found the copolymer adhering to the stirrer or the inner wall of the autoclave.

A yield of the copolymer per one gram of the solid catalyst component was found to be 9,700 g-copolymer/g-solid catalyst component (polymerization activity). The copolymer was found to have a short-chain branch number (referred to hereinafter as "SCB") of 13.2/1,000 C; and 4.3% by weight of a soluble part in xylene at 20° C. (referred to hereinafter as "CXS"). Results are shown in Table 1.

The above SCB, which means the number of a methyl group per 1,000 carbon atoms, was measured from characteristic absorptions of an ethylene unit and a 1-butene unit assigned in an infrared absorption spectrum measured with an infrared spectrophotometer, FT/IR-470PLUS, manufactured by Japan Spectroscopic Co., Ltd., using a calibration curve.

The above CXS (% by weight), which means an amount of a soluble part in xylene at 20° C., was measured according to a method comprising steps of:
(i) adding 1 g of a copolymer to 200 ml of boiling xylene, thereby obtaining a solution;
(ii) cooling the solution slowly down to 50° C.;
(iii) further cooling the solution down to 20° C. by dipping it in an iced water bath under stirring;
(iv) keeping the solution at 20° C. for three hours, thereby precipitating a copolymer;
(v) filtering off the precipitated copolymer, thereby obtaining a filtrate;
(vi) distilling xylene contained in the filtrate away to dryness, thereby obtaining a soluble part;
(vii) weighing the soluble part; and (viii) calculating CXS based thereon.

Comparative Example 1

(1) Production of Solid Catalyst Component

Example 1 was repeated except that 4.5 mL of dodecanedioyl dichloride was changed to 4.5 mL of sebacoyl dichloride, thereby obtaining a solid catalyst component.

(2) Polymerization of Ethylene with 1-butene

Example 1 was repeated except that 3.40 mg of the solid catalyst component was changed to 13.73 mg of the above-obtained solid catalyst component, thereby obtaining 6 g of an ethylene-1-butene copolymer.

A yield of the copolymer per one gram of the solid catalyst component was found to be 400 g-copolymer/g-solid catalyst component (polymerization activity). The copolymer was found to have SCB of 6.0/1,000 C; and 1.2% by weight of CXS. Results are shown in Table 1.

Example 2

(1) Production of Solid Catalyst Component

Section (2) of Example 1 was repeated except that 4.5 mL of dodecanedioyl dichloride was changed to a combination of 4.5 mL of bis(2-ethylhexyl)dodecanedioate (internal electron donor) with 5.1 ml of phenyltrichlorosilane (halogenated metal compound), thereby obtaining a solid catalyst component.

(2) Polymerization of Ethylene with 1-butene

Example 1 was repeated except that 3.40 mg of the solid catalyst component was changed to 9.81 mg of the above-obtained solid catalyst component, thereby obtaining 101 g of an ethylene-1-butene copolymer.

A yield of the copolymer per one gram of the solid catalyst component was found to be 10,300 g-copolymer/g-solid catalyst component (polymerization activity). The copolymer was found to have SCB of 12.1/1,000 C; and 3.5% by weight of CXS. Results are shown in Table 1.

Example 3

(1) Production of Solid Catalyst Component

Section (2) of Example 1 was repeated except that 4.5 mL of dodecanedioyl dichloride was changed to a combination of 4.5 mL of diethyl dodecanedioate (internal electron donor) with 5.1 ml of phenyltrichlorosilane, thereby obtaining a solid catalyst component.

(2) Polymerization of Ethylene with 1-butene

Example 1 was repeated except that 3.40 mg of the solid catalyst component was changed to 12.98 mg of the above-obtained solid catalyst component, thereby obtaining 38 g of an ethylene-1-butene copolymer.

A yield of the copolymer per one gram of the solid catalyst component was found to be 2,900 g-copolymer/g-solid catalyst component (polymerization activity). The copolymer was found to have SCB of 12.1/1,000 C; and 3.3% by weight of CXS. Results are shown in Table 1.

Example 4

(1) Production of Solid Catalyst Component

Section (2) of Example 1 was repeated except that 4.5 mL of dodecanedioyl dichloride was changed to a combination of 3.0 mL of di-n-butyl dodecanedioate (internal electron donor) with 5.1 ml of phenyltrichlorosilane, thereby obtaining a solid catalyst component.

(2) Polymerization of Ethylene with 1-butene

Example 1 was repeated except that 3.40 mg of the solid catalyst component was changed to 5.75 mg of the above-obtained solid catalyst component, thereby obtaining 30 g of an ethylene-1-butene copolymer.

A yield of the copolymer per one gram of the solid catalyst component was found to be 5,200 g-copolymer/g-solid catalyst component (polymerization activity). The copolymer was found to have SCB of 13.6/1,000 C; and 4.4% by weight of CXS. Results are shown in Table 1.

TABLE 1

|  | Example | | | | Comparative |
| --- | --- | --- | --- | --- | --- |
|  | 1 | 2 | 3 | 4 | Example 1 |
| Internal electron donor (mL used) | | | | | |
| Dodecanedioyl dichloride | 4.5 | | | | |
| Bis(2-ethylhexyl) dodecanedioate | | 4.5 | | | |
| Diethyl dodecanedioate | | | 4.5 | | |
| Di-n-butyl dodecanedioate | | | | 3.0 | |
| Sebacoyl dichloride | | | | | 4.5 |
| Phenyltrichlorosilane (mL used) | | 5.1 | 5.1 | 5.1 | |
| Ethylene-1-butene copolymer | | | | | |
| Polymerization activity* | 9,700 | 10,300 | 2,900 | 5,200 | 400 |
| SCB (/1,000 C) | 13.2 | 12.1 | 12.1 | 13.6 | 6.0 |
| CXS (% by weight) | 4.3 | 3.5 | 3.3 | 4.4 | 1.2 |

*Unit: g-copolymer/g-solid catalyst component

The invention claimed is:

1. A solid catalyst component for olefin polymerization containing a titanium atom, a magnesium atom, a halogen atom, and an internal electron donor represented by formula (I)

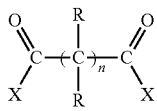
(I)

wherein R is a hydrogen atom, a halogen atom, or a hydrocarbyl group having 1 to 10 carbon atoms, and plural Rs are the same as, or different from one another; X is a halogen atom or a hydrocarbyloxy group having 1 to 10 carbon atoms, and two Xs are the same as, or different from each other; and n is an integer satisfying $10 \leq n \leq 20$.

2. The solid catalyst component according to claim 1, wherein n in formula (I) is an integer satisfying $10 \leq n \leq 18$.

3. The solid catalyst component according to claim 1, wherein n in formula (I) is an integer satisfying $10 \leq n \leq 16$.

4. A process for producing a solid catalyst component for olefin polymerization containing a titanium atom, a magnesium atom, a halogen atom, and an internal electron donor represented by formula (I), comprising a step of contacting a titanium compound, a magnesium compound, and an internal electron donor represented by formula (I) with one another, or comprising a step of contacting a solid component containing a titanium atom and a magnesium atom with an internal electron donor represented by formula (I):

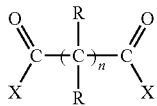
(I)

wherein R is a hydrogen atom, a halogen atom, or a hydrocarbyl group having 1 to 10 carbon atoms, and plural Rs are the same as, or different from one another; X is a halogen atom or a hydrocarbyloxy group having 1 to 10 carbon atoms, and two Xs are the same as, or different from each other; and n is an integer satisfying $10 \leq n \leq 20$.

5. The process according to claim 4, wherein the magnesium compound is a magnesium halide.

6. The process according to claim 4, wherein the magnesium compound is a dialkoxymagnesium.

7. The process according to claim 4, wherein the magnesium compound is an alkoxymagnesium halide.

8. The process according to claim 4, wherein the solid component is a solid catalyst component precursor containing a trivalent titanium atom, a magnesium atom and a hydrocarbyloxy group.

9. The process according to claim 8, wherein the solid catalyst component precursor is produced by a process comprising a step of reducing a titanium compound represented by formula (vii) with an organomagnesium compound in the presence of a silicon compound containing a Si—O bond:

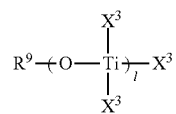
(vii)

wherein $R^9$ is a hydrocarbyl group having 1 to 20 carbon atoms; $X^3$ is a halogen atom, or a hydrocarbyloxy group having 1 to 20 carbon atoms, and plural $X^3$s are the same as, or different from one another; and l is an integer of 1 to 20.

10. The process according to claim 4, wherein X in formula (I) is a halogen atom.

11. A process for producing a solid catalyst for olefin polymerization, comprising a step of contacting (i) the solid catalyst component of claim 1, (ii) an organoaluminum compound, and (iii) an optional external electron donor, with one another.

12. A process for producing an olefin polymer, comprising a step of polymerizing an olefin in the presence of a solid catalyst produced by the process of claim 11.

13. The process according to claim 12, wherein the olefin is a combination of ethylene with an α-olefin.

14. A process for producing a solid catalyst for olefin polymerization, comprising a step of contacting (i) a solid catalyst component produced by the process of claim 4, (ii) an organoaluminum compound, and (iii) an optional external electron donor, with one another.

* * * * *